United States Patent
Khaleghi

(10) Patent No.: US 11,482,221 B2
(45) Date of Patent: *Oct. 25, 2022

(54) IMPAIRED OPERATOR DETECTION AND INTERLOCK APPARATUS

(71) Applicant: The Notebook, LLC, Santa Monica, CA (US)

(72) Inventor: Karen Elaine Khaleghi, Pacific Palisades, CA (US)

(73) Assignee: The Notebook, LLC, Pacific Palisades, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/775,710

(22) Filed: Jan. 29, 2020

(65) Prior Publication Data

US 2020/0258516 A1    Aug. 13, 2020

Related U.S. Application Data

(63) Continuation of application No. 16/275,132, filed on Feb. 13, 2019, now Pat. No. 10,559,307.

(51) Int. Cl.

| | | |
|---|---|---|
| *G10L 15/00* | (2013.01) | |
| *G10L 15/22* | (2006.01) | |
| *G10L 25/63* | (2013.01) | |
| *G10L 25/66* | (2013.01) | |
| *G10L 25/90* | (2013.01) | |

(Continued)

(52) U.S. Cl.
CPC ............ *G10L 15/22* (2013.01); *G06V 40/168* (2022.01); *G10L 15/26* (2013.01); *G10L 25/63* (2013.01); *G10L 25/66* (2013.01); *G10L 25/90* (2013.01); *B60K 28/06* (2013.01); *G10L 2015/223* (2013.01)

(58) Field of Classification Search
CPC ......... B60K 28/063; A61B 5/18; G10L 25/21; G10L 15/22

See application file for complete search history.

(56) References Cited

U.S. PATENT DOCUMENTS

| | | |
|---|---|---|
| 3,594,066 A | 7/1971 | Cook |
| 3,649,765 A | 3/1972 | Rabiner |

(Continued)

FOREIGN PATENT DOCUMENTS

KR    10-2018-0004312 A    1/2018

OTHER PUBLICATIONS

Healow Home Page, dated Apr. 17, 2016, 3 pages—https://web.archive.org/web/20160417210345/https://healow.com/apps/jsp/webview/signIn.jsp.

(Continued)

*Primary Examiner* — Daniel Abebe
(74) *Attorney, Agent, or Firm* — Knobbe, Martens, Olson & Bear LLP

(57) ABSTRACT

Systems and methods are disclosed configured to detect impairment issues, and via an interlock device, inhibit operation of an item of equipment when impairment is detected. The interlock device may comprise a solid state relay, an electromechanical relay, and/or a solenoid. The interlock device may perform power isolation and/or may use a mechanism, such as a rotating cam or gear, to immobilize a control and/or other components. Based on detected impairment, a determination is made as to whether the interlock is to be activated or deactivated.

28 Claims, 12 Drawing Sheets

(51) Int. Cl.
*G10L 15/26* (2006.01)
*G06V 40/16* (2022.01)
*B60K 28/06* (2006.01)

(56) References Cited

U.S. PATENT DOCUMENTS

| | | | |
|---|---|---|---|
| 4,682,361 A | 7/1987 | Selbach | |
| 5,293,584 A | 3/1994 | Brown | |
| 5,579,393 A | 11/1996 | Conner | |
| 5,633,910 A | 5/1997 | Cohen | |
| 5,699,404 A | 12/1997 | Satyamurti | |
| 5,798,695 A | 8/1998 | Metalis et al. | |
| 5,823,948 A | 10/1998 | Ross | |
| 5,924,074 A | 7/1999 | Evans | |
| 6,039,688 A | 3/2000 | Douglas | |
| 6,047,254 A | 4/2000 | Ireton | |
| 6,234,964 B1 | 5/2001 | Iliff | |
| 6,290,646 B1 | 9/2001 | Cosentino | |
| 6,292,771 B1 | 9/2001 | Haug | |
| 6,411,933 B1 | 6/2002 | Maes | |
| 6,544,294 B1 | 4/2003 | Greenfield | |
| 6,726,636 B2 * | 4/2004 | Der Ghazarian | B60K 28/063 600/532 |
| 6,941,271 B1 | 9/2005 | Soong | |
| 7,174,332 B2 | 2/2007 | Baxter | |
| 7,222,075 B2 | 5/2007 | Petrushin | |
| 7,302,490 B1 | 11/2007 | Gupta | |
| 7,616,125 B2 | 11/2009 | Johns | |
| 7,647,555 B1 | 1/2010 | Wilcox | |
| 7,770,117 B1 | 8/2010 | Uy | |
| 7,783,072 B2 | 8/2010 | Work | |
| 7,788,605 B1 | 8/2010 | Shoemaker | |
| 8,255,225 B2 | 8/2012 | Byford | |
| 8,374,992 B2 | 2/2013 | Meyyappan et al. | |
| 8,533,511 B2 | 9/2013 | Ma et al. | |
| 8,606,595 B2 | 12/2013 | Udani | |
| 8,775,213 B2 | 7/2014 | Hughes | |
| 8,826,123 B2 | 9/2014 | Audet | |
| 8,868,436 B2 | 10/2014 | Gotthardt | |
| 9,070,357 B1 | 6/2015 | Kennedy | |
| 9,158,335 B2 | 10/2015 | Zheng | |
| 9,252,962 B1 | 2/2016 | Valeti | |
| 9,256,588 B1 | 2/2016 | Moscovich et al. | |
| 9,256,719 B2 | 2/2016 | Serini | |
| 9,305,155 B1 | 4/2016 | Vo | |
| 9,619,616 B2 | 4/2017 | Raduchel | |
| 9,630,497 B2 | 4/2017 | Quix et al. | |
| 9,658,756 B2 | 5/2017 | Freeman | |
| 9,733,801 B2 | 8/2017 | Audet | |
| 9,788,799 B2 | 10/2017 | Wagner | |
| 9,899,038 B2 | 2/2018 | Khaleghi | |
| 9,905,108 B2 | 2/2018 | Kaplan et al. | |
| 9,928,379 B1 | 3/2018 | Hoffer | |
| 9,934,793 B2 * | 4/2018 | Bae | G10L 25/21 |
| 9,959,556 B1 | 5/2018 | Cordell | |
| 10,014,004 B2 | 7/2018 | Khaleghi | |
| 10,032,120 B2 | 7/2018 | Collins | |
| 10,121,345 B1 | 11/2018 | Fields et al. | |
| 10,187,762 B2 | 1/2019 | Khaleghi | |
| 10,235,998 B1 | 3/2019 | Khaleghi | |
| 10,484,845 B2 | 11/2019 | Khaleghi | |
| 10,516,938 B2 | 12/2019 | Zass | |
| 10,657,166 B2 | 5/2020 | Gorzela | |
| 2001/0034639 A1 | 10/2001 | Jacoby | |
| 2001/0037219 A1 | 11/2001 | Malik | |
| 2002/0010679 A1 | 1/2002 | Felsher | |
| 2002/0012526 A1 | 1/2002 | Sai | |
| 2002/0022975 A1 | 2/2002 | Blasingame | |
| 2002/0026329 A1 | 2/2002 | Saito | |
| 2002/0029157 A1 | 3/2002 | Marchosky | |
| 2002/0035486 A1 | 3/2002 | Huyn | |
| 2002/0062225 A1 | 5/2002 | Siperco | |
| 2002/0078044 A1 | 6/2002 | Song | |
| 2002/0082865 A1 | 6/2002 | Bianco | |
| 2002/0116188 A1 | 8/2002 | Amir | |
| 2002/0138271 A1 | 9/2002 | Shaw | |
| 2002/0145742 A1 | 10/2002 | Koenig et al. | |
| 2003/0115054 A1 | 6/2003 | Iso-Sipila | |
| 2003/0135095 A1 | 7/2003 | Iliff | |
| 2003/0140044 A1 | 7/2003 | Mok | |
| 2004/0034869 A1 | 2/2004 | Wallace | |
| 2004/0059599 A1 | 3/2004 | McIvor | |
| 2004/0133560 A1 | 7/2004 | Simske | |
| 2004/0153289 A1 | 8/2004 | Casey | |
| 2004/0243443 A1 | 12/2004 | Asano | |
| 2005/0055399 A1 | 3/2005 | Savchuk | |
| 2005/0096906 A1 | 5/2005 | Barzilay | |
| 2005/0137723 A1 | 6/2005 | Liu | |
| 2005/0147214 A1 | 7/2005 | Goerg et al. | |
| 2005/0149569 A1 | 7/2005 | Hariharan | |
| 2005/0165626 A1 | 7/2005 | Karpf | |
| 2005/0172022 A1 | 8/2005 | Brown | |
| 2006/0001666 A1 | 1/2006 | Cake et al. | |
| 2006/0011399 A1 | 1/2006 | Brockway et al. | |
| 2006/0028556 A1 * | 2/2006 | Bunn | G10L 15/25 348/211.99 |
| 2006/0047497 A1 | 3/2006 | Chen | |
| 2006/0052674 A1 | 3/2006 | Eisenstein | |
| 2006/0053009 A1 * | 3/2006 | Jeong | G10L 15/30 704/234 |
| 2006/0085347 A1 | 4/2006 | Yiachos | |
| 2006/0148528 A1 | 7/2006 | Jung | |
| 2006/0253281 A1 | 11/2006 | Letzt | |
| 2006/0293891 A1 * | 12/2006 | Pathuel | G07C 9/37 704/246 |
| 2007/0024454 A1 * | 2/2007 | Singhal | G08B 21/06 340/576 |
| 2007/0074114 A1 | 3/2007 | Adjali | |
| 2007/0124135 A1 * | 5/2007 | Schultz | G10L 17/26 704/201 |
| 2007/0168413 A1 | 7/2007 | Barletta | |
| 2007/0208800 A1 | 9/2007 | Frohlich | |
| 2007/0216708 A1 | 9/2007 | Mackay | |
| 2007/0276270 A1 | 11/2007 | Tran | |
| 2008/0040151 A1 | 2/2008 | Moore | |
| 2008/0066973 A1 | 3/2008 | Furuki | |
| 2008/0104048 A1 | 5/2008 | Surendran | |
| 2008/0126426 A1 | 5/2008 | Manas | |
| 2008/0133233 A1 | 6/2008 | Tsu Bu Ra | |
| 2008/0195495 A1 | 8/2008 | Rubin et al. | |
| 2008/0212746 A1 | 9/2008 | Gupta | |
| 2008/0244453 A1 | 10/2008 | Cafer | |
| 2008/0301176 A1 | 12/2008 | Fanelli | |
| 2008/0313536 A1 | 12/2008 | Larsen | |
| 2008/0319750 A1 | 12/2008 | Potter | |
| 2009/0055735 A1 | 2/2009 | Zaleski | |
| 2009/0077045 A1 | 3/2009 | Kirchmeier | |
| 2009/0117922 A1 | 5/2009 | Bell | |
| 2009/0292554 A1 | 11/2009 | Schultz | |
| 2009/0313347 A1 | 12/2009 | Engel | |
| 2010/0036871 A1 | 2/2010 | Beckey et al. | |
| 2010/0076333 A9 | 3/2010 | Burton | |
| 2010/0169108 A1 | 7/2010 | Karkanias | |
| 2010/0228656 A1 | 9/2010 | Wasserblat et al. | |
| 2010/0262435 A1 | 10/2010 | Smith | |
| 2010/0286490 A1 | 11/2010 | Koverzin | |
| 2011/0034565 A1 | 2/2011 | Regan | |
| 2011/0040155 A1 | 2/2011 | Guzak | |
| 2011/0068934 A1 | 3/2011 | Weng et al. | |
| 2011/0091050 A1 | 4/2011 | Hanai | |
| 2011/0099189 A1 | 4/2011 | Barraclough | |
| 2011/0099490 A1 | 4/2011 | Barraclough | |
| 2011/0118555 A1 | 5/2011 | Dhumne | |
| 2011/0148668 A1 | 6/2011 | Li | |
| 2011/0184781 A1 | 7/2011 | Hussam | |
| 2011/0202866 A1 | 8/2011 | Huang | |
| 2011/0239158 A1 | 9/2011 | Barraclough | |
| 2012/0005099 A1 | 1/2012 | Beckey | |
| 2012/0112879 A1 * | 5/2012 | Ekchian | B60K 28/063 340/5.53 |
| 2012/0198385 A1 | 8/2012 | Audet | |
| 2012/0299926 A1 | 11/2012 | Hodes | |
| 2012/0306648 A1 | 12/2012 | Karaffa | |
| 2012/0306925 A1 | 12/2012 | Hwang | |

(56) References Cited

U.S. PATENT DOCUMENTS

| | | |
|---|---|---|
| 2012/0323589 A1 | 12/2012 | Udani |
| 2012/0323796 A1 | 12/2012 | Udani |
| 2013/0009907 A1 | 1/2013 | Rosenberg |
| 2013/0024206 A1 | 1/2013 | Hughes |
| 2013/0085781 A1 | 4/2013 | Navani |
| 2013/0111331 A1 | 5/2013 | Rosen et al. |
| 2013/0124192 A1 | 5/2013 | Lindmark |
| 2013/0163956 A1 | 6/2013 | Medhurst |
| 2013/0185071 A1 | 7/2013 | Chen |
| 2013/0257777 A1 | 10/2013 | Benko |
| 2013/0275151 A1 | 10/2013 | Moore |
| 2013/0325493 A1 | 12/2013 | Wong |
| 2014/0019119 A1 | 1/2014 | Liu |
| 2014/0068489 A1 | 3/2014 | Wyland |
| 2014/0074454 A1 | 3/2014 | Brown |
| 2014/0081667 A1 | 3/2014 | Joao |
| 2014/0136233 A1 | 5/2014 | Atkinson |
| 2014/0143671 A1 | 5/2014 | Kovalick |
| 2014/0164310 A1 | 6/2014 | Chen |
| 2014/0164784 A1 | 6/2014 | Sinderbrand |
| 2014/0172707 A1 | 6/2014 | Kuntagod |
| 2014/0172804 A1 | 6/2014 | Kaufman |
| 2014/0195221 A1 | 7/2014 | Frank |
| 2014/0244277 A1 | 8/2014 | Krishna |
| 2014/0249860 A1 | 9/2014 | Rynchek |
| 2014/0253467 A1 | 9/2014 | Hicks |
| 2014/0304005 A1 | 10/2014 | Hughes |
| 2014/0304200 A1 | 10/2014 | Wall |
| 2014/0379374 A1 | 12/2014 | Vinals |
| 2015/0038123 A1* | 2/2015 | Tuukkanen ............ H04W 4/40 455/414.1 |
| 2015/0058013 A1 | 2/2015 | Pakhomov |
| 2015/0072330 A1 | 3/2015 | Rosenberg |
| 2015/0100339 A1 | 4/2015 | Kim |
| 2015/0134346 A1 | 5/2015 | Hyde |
| 2015/0149095 A1 | 5/2015 | Otvos |
| 2015/0164436 A1 | 6/2015 | Maron |
| 2015/0169717 A1 | 6/2015 | Wang |
| 2015/0178457 A1 | 6/2015 | Grimley |
| 2015/0206544 A1 | 7/2015 | Carter |
| 2015/0228277 A1 | 8/2015 | Anhari |
| 2015/0257681 A1 | 9/2015 | Shuster |
| 2015/0258892 A1 | 9/2015 | Wu |
| 2015/0310455 A1 | 10/2015 | Vinals |
| 2015/0314681 A1 | 11/2015 | Riley, Sr. |
| 2015/0363657 A1 | 12/2015 | Shigemura |
| 2015/0379200 A1 | 12/2015 | Gifford |
| 2016/0004820 A1 | 1/2016 | Moore |
| 2016/0012196 A1 | 1/2016 | Mark |
| 2016/0027264 A1 | 1/2016 | Choi |
| 2016/0078771 A1 | 3/2016 | Zhuang |
| 2016/0080403 A1 | 3/2016 | Cunningham |
| 2016/0143594 A1 | 5/2016 | Moorman |
| 2016/0297359 A1 | 10/2016 | Kirsch et al. |
| 2016/0342741 A1 | 11/2016 | Chin |
| 2017/0007167 A1 | 1/2017 | Kostic et al. |
| 2017/0060997 A1 | 3/2017 | Lee |
| 2017/0161439 A1 | 6/2017 | Raduchel |
| 2017/0166054 A1 | 6/2017 | Ayala Rodriguez |
| 2017/0190251 A1 | 7/2017 | Wu |
| 2017/0195637 A1 | 7/2017 | Kusens |
| 2017/0200449 A1 | 7/2017 | Penilla et al. |
| 2017/0235888 A1 | 8/2017 | Rahman |
| 2017/0251985 A1 | 9/2017 | Howard |
| 2017/0333560 A1 | 11/2017 | Epshtein |
| 2017/0359551 A1 | 12/2017 | Shaw |
| 2018/0027006 A1 | 1/2018 | Zimmermann |
| 2018/0032997 A1 | 2/2018 | Gordon |
| 2018/0060899 A1 | 3/2018 | Das |
| 2018/0090155 A1 | 3/2018 | Moriya |
| 2018/0144763 A1 | 5/2018 | Khaleghi |
| 2018/0153862 A1 | 6/2018 | Coric |
| 2018/0193652 A1 | 7/2018 | Srivastava |
| 2018/0200142 A1 | 7/2018 | Freeman |
| 2018/0211059 A1 | 7/2018 | Aunger |
| 2018/0214061 A1 | 8/2018 | Knoth |
| 2018/0267700 A1 | 9/2018 | Kaditz |
| 2018/0285542 A1 | 10/2018 | Xiao |
| 2018/0322265 A1 | 11/2018 | Kwok-Suzuki et al. |
| 2019/0006040 A1 | 1/2019 | Fleming |
| 2019/0035132 A1 | 1/2019 | Dirksen |
| 2019/0051144 A1 | 2/2019 | David |
| 2019/0060367 A1 | 2/2019 | Zhang |
| 2019/0095632 A1 | 3/2019 | Seinen |
| 2019/0155954 A1 | 5/2019 | Goyal |
| 2019/0208354 A1 | 7/2019 | Raduchel |
| 2019/0239789 A1 | 8/2019 | Jung |

OTHER PUBLICATIONS

Shah, Bhakti, "eClinicalWorks Invest $25 Million in Patient Engagement," dated Feb. 6, 2013, 3 pages—https://www.eclinicalworks.com/pr-eclinicalworks-invests-25-million/.

PCT International Search Report and Written Opinion, regarding International Application No. PCT/US2020/017781 dated Jun. 2, 2020, 12 pages.

Matheson, "Watch Your Tone—Voice-Analytics Software Helps Customer-Service Reps Build Better Rapport with Customers," MIT News Office, http://news.mit.edu/2016/startup-cogito-voice-analytics-call-centers-ptsd-0120; Jan. 20, 2016; 4 pages.

Mullin, "Rewriting Life—Voice Analysis Tech Could Diagnose Disease," https://www.technologyreview.com/s/603200/voice-analysis-tech-could-diagnose-disease/; Jan. 19, 2017; 9 pages.

Nield, "Scientists Can Now Diagnose Depression Just by Listening to Your Voice," IEEE Transactions on Affective Computing; Science Alert, https://www.sciencealert.com/this-computer-program-can-tell-when-someone-s-depressed-by-their-speech-patterns; Jul. 11, 2016; 4 pages.

PCT International Search Report and Written Opinion, regarding International Application No. PCT/US2019/019438, dated Jun. 14, 2019, 19 pages.

Scherer et al., "Investigating Voice Quality as a Speaker-Independent Indicator of Depression and PTSD", University of Southern California, Institute for Creative Technologies; 5 pages; Los Angeles, California, 2013.

* cited by examiner

IMPAIRED OPERATOR DETECTION AND INTERLOCK APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This document relates to systems and techniques for detecting operator impairment and inhibiting impaired operators from engaging in tasks and operating equipment.

Description of the Related Art

Conventional techniques for detecting user impairment and preventing impaired users from operating equipment fail to adequately detect such user impairment. Hence, such conventional techniques fails to adequately inhibit impaired users from operating dangerous equipment or performing dangerous tasks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure relate to systems and methods configured to detect impairment issues, and optionally, via an interlock, inhibit a subject's ability to operate an item of equipment or perform certain other tasks. Optionally, the interlock may comprise a solid state relay, an electromechanical relay, and/or a solenoid. The interlock may perform power isolation and/or may use a mechanism, such as a rotating cam or gear, to immobilize a control, a key, and/or other components. A digital signal processing module may optionally be used to process digitized human vocal expression and digital images of a subject to determine impairment. Based on detected impairment, optionally a determination is made as to whether the interlock is to be activated or deactivated.

An aspect of the present disclosure relates to an electronic interlock system configured to selectively immobilize equipment using an interlock device, comprising: a network interface; at least one computing device; computer readable memory including instructions operable to be executed by the at least one computing device to perform a set of actions, configuring the at least one computing device: receive in real time, over a network via the network interface, a digitized human vocal expression of a first user and one or more digital images of the first user from a remote device; process the received digitized human vocal expression to: identify length of pauses between words, shimmer, jitter, coughs, and/or random non-speech audible expressions; convert audible speech in the human vocal expression to text and characterize audible speech in the human vocal expression using the text; compare the determined characteristics of the human vocal expression with baseline, historical characteristics of human vocal expressions associated with the first user to identify changes in human vocal expression characteristics of the first user; process the received one or more images to detect characteristics of the first user face, including detecting if one or more of the following are present: a sagging lip, facial droop, and dilated pupils; compare one or more of the detected characteristics of the first user face with baseline, historical characteristics of the first user face accessed from a data store, and identify changes in characteristics of the first user face; based at least on part on identified changes in human vocal expression characteristics of the first user and identified changes in characteristics of the first user face, determine an impairment categorization for the first user; and use the impairment categorization for the first user to determine whether the equipment is to be immobilized using the interlock device; at least partly in response to a determination that the equipment is to be immobilized, controlling the interlock device so as to immobilize the equipment.

An aspect of the present disclosure relates to a computer implemented method comprising: under control of a hardware computing device configured with specific computer executable instructions: receiving, over a network via a network interface from a remote device, a digitized human vocal expression of a first user and one or more digital images; processing the received digitized human vocal expression to: detect speech characteristics including one or more of: length of pauses between words, shimmer, jitter, coughs, slurred words, unintelligible speech, shaky speech, broken speech, disjointed speech, word interjections, repetitive speech, phrase interjections, sound interjections, word omissions, word revisions, broken suffixes, amplitude, vocal tract closure durations, and/or random non-speech audible expressions; processing the received one or more images to detect characteristics of the first user face, including detecting if the first user has: a sagging lip, facial droop, slow eye movements, drifting eye movements, deficits in saccadic movement, partial eye closures, drooping eyelids, and/or a dilated pupil; using the detected speech characteristics of the first user face to determine an impairment categorization for the first user; and using the impairment categorization for the first user to determine whether an item of equipment is to be inhibited from use by the first user; at least partly in response to determining that the equipment is to be inhibited from use by the first user, controlling an interlock device so as to inhibit use of the equipment by the first user.

An aspect of the present disclosure relates to a non-transitory computer-readable storage medium storing computer executable instructions that when executed by a processor perform operations comprising: receiving a digitized human vocal expression of a first user and one or more digital images of the first user; processing the received digitized human vocal expression to detect speech characteristics of the digitized human vocal expression including: length of pauses between words, shimmer, jitter, coughs, slurred words, unintelligible speech, shaky speech, broken speech, disjointed speech, word interjections, repetitive speech, phrase interjections, sound interjections, word omissions, word revisions, broken suffixes, amplitude, vocal tract closure durations, and/or random non-speech audible expressions; processing the received one or more images to detect characteristics of the first user face relating to user impairment; using the detected speech characteristics and the detected characteristics of the first user face to determine an impairment categorization for the first user; and using the impairment categorization for the first user, determining whether the first user is to be inhibited from performing a first action; and at least partly in response to determining that the first user is to be inhibited from performing a first action, generating a signal configured to cause the first user to be inhibited from performing the first action.

An aspect of the present disclosure relates to a system, comprising: a network interface; at least one computing device; computer readable memory including instructions operable to be executed by the at least one computing device to perform a set of actions, configuring the at least one computing device: receive, via the network interface, a digitized human vocal expression of a first user and one or more digital images; process the received digitized human vocal expression to detect speech characteristics of the digitized human vocal expression including: length of pauses between words, shimmer, jitter, coughs, slurred words, unintelligible speech, shaky speech, broken speech, disjointed speech, word interjections, repetitive speech, phrase interjections, sound interjections, word omissions, word revisions, broken suffixes, amplitude, vocal tract closure durations, and/or random non-speech audible expressions; process the received one or more images to detect characteristics of the first user face relating to user impairment; use the detected speech characteristics and the detected characteristics of the first user face to determine an impairment categorization for the first user; and use the impairment categorization for the first user to determine whether the first user is to be inhibited from performing a first action; and at least partly in response to a determination that the first user is to be inhibited from performing a first action, generate a signal configured to cause the first user to be inhibited from performing the first action.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1:
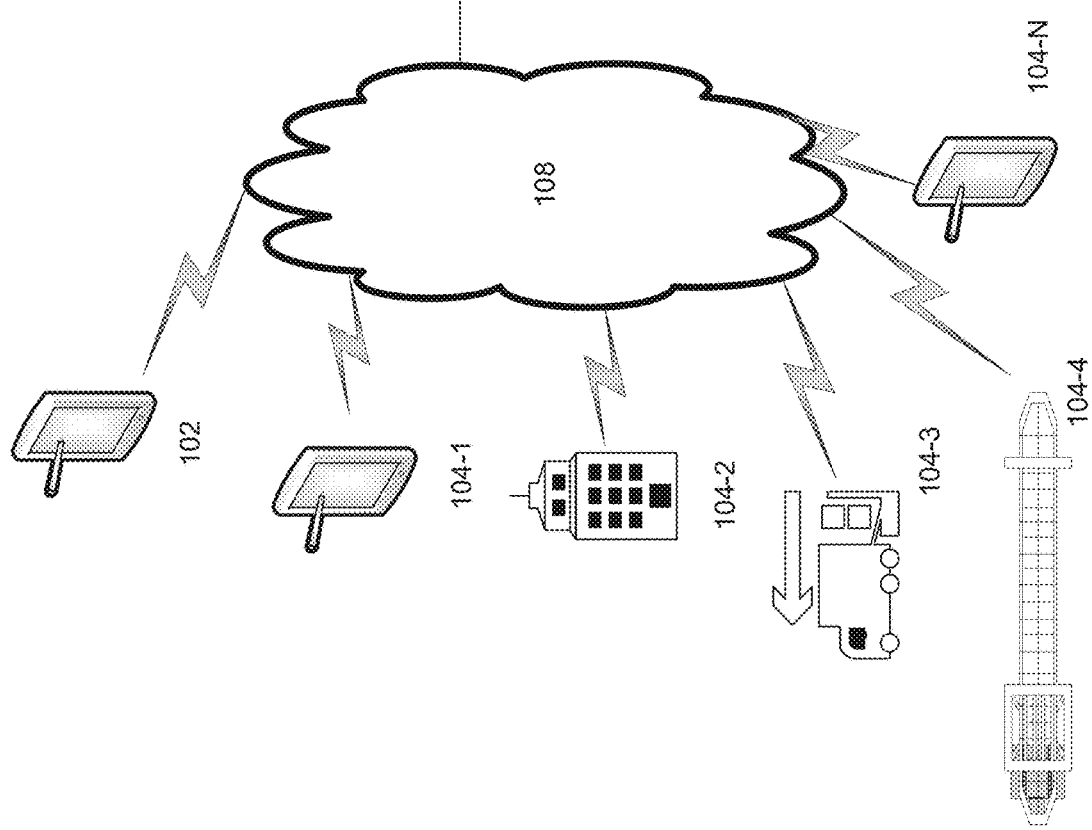
FIG. 1 illustrates an example architecture.

An impairment detection system is described configured to determine impairment of an operator of equipment, a system, a vehicle, or of a person engaging potentially risky tasks, thereby reducing the risk of accidents, personal injury, and property damages. As used herein, equipment may include any type of equipment (e.g., vehicles, construction equipment, warehouse equipment, medical equipment, manufacturing equipment, cooking equipment, safety barriers, firearms, etc.).

When a person is responsible for operating potentially dangerous equipment, or is performing a task associated with significant risk (e.g., surgery) it is essential that the person is not unacceptably cognitively impaired and does not have unacceptably impaired motor skills. Medical issues, such as a stroke, being under the influence of drugs or alcohol, depression, post-traumatic stress disorder, or lack of sleep can impair a user's ability to safely operate equipment or perform other tasks. Therefore, it is advantageous to monitor people before permitting them to operate potentially dangerous equipment or before undertaking tasks that if not performed properly can affect the safety of people or property. Further, such monitoring may optionally be performed continuously when a person is operating such equipment or undertaking such tasks to ensure that a health issue or other issue has not occurred that would unacceptably impair the persons cognitive and/or motor skills.

Conventionally, breath analyzers have been used to determine breath alcohol readings of people and to determine whether such readings exceed certain preset breath alcohol reading limits with respect to operating vehicles. In order to measure a person's alcohol level using a breath analyzer, a person needs to breathe into a measurement device. The disadvantages of breath analyzers include the possibility that a person (e.g., an equipment operator) will have someone else breath into the breath analyzer. A further disadvantage is that breath analyzers may be considered demeaning to use. Further, a breath analyzer is not capable of detecting many types of drugs that the person may be taking. In addition, breath analyzers are typically only utilized prior to operating equipment, and not during the operation of the equipment, and so a person may imbibe alcohol while operating equipment without being detected.

Conventionally, tests for the presence of certain drugs may be performed using immuno assay strips by wiping the strip or on the forehead, palm, or tongue of an individual or by immersing the test strip in urine of the individual. The disadvantages of drug test strips include the possibility that a person (e.g., an equipment operator) will submit a test strip applied to a different person. A further disadvantage is that test strips may be considered demeaning to use. In addition, assay strips are typically only utilized prior to operating equipment, and not during the operation of the equipment, and so a person may partake of drugs or other impairing substance while operating equipment without being detected.

As used herein, the phrase "impairing substance" includes substances (e.g., medicine, mind altering drugs, drugs that impair motor skills, alcohol, etc.) which can impair a person's ability to perform certain tasks (e.g., operate certain equipment, perform medical procedures, teach children, supervise the elderly, etc.) if present at certain levels in the person's body. In addition, the phrase "subject" as used herein refers to a person who is being evaluated for impairment. By way of illustration, the subject being monitored may be a driver, a pilot, a heavy equipment operator, a doctor, a medical technician, a teacher, a caretaker, a police officer, a fireman, a judicial officer, or other individual whose impairment may be unacceptable or undesirable from the standpoint of a task or job function they are to perform.

Further, neither breath analyzers nor drug test strips can detect whether a person is fatigued or is suffering from an impairing medical condition (e.g., a stroke, dementia, epileptic episode, episodes of hypoglycemia, life-threatening whole-body response to an allergen, depressed, suffering from post-traumatic stress disorder, etc.).

Still further, certain conventional systems for detecting fatigue fail to adequately detect fatigue and/or provide false positives, indicating that a person is fatigued when the person is not fatigued.

Additionally, visual observation of a subject by a human will often miss subtle signs of impairment and are often completely inadequate in detecting certain types of drug use.

To overcome one or more of the foregoing drawbacks of conventional techniques and systems, disclosed herein is an impairment detection system which can detect different types of impairment events, such as whether a person is under the influence of an impairing substance, whether a person has an impairing medical condition, and/or whether a person is suffering from an impairing fatigue. Such impairment detection may be performed prior to a person operating equipment or performing a given task, and/or the impairment detection may be performed periodically or continuously while a person is operating equipment or performing a given task. Among other optional benefits, the disclosed systems and processes better ensure that equipment is utilized safely and efficiently, and reduce the possibility that equipment will harm people or property.

As discussed in greater detail herein, complex, subtle, and detailed computer analysis of sensor readings of a subject's facial features, speech, and/or other aspects of a subject may be performed to determine whether a subject is impaired and the level of impairment, and to determine what action is to be taken based on such analysis. Such complex, subtle, and detailed computer analysis is beyond the ability of even a highly trained human to perform, much less a conventional security person or supervisor.

By way of illustration, optionally, based on the analysis of sensor readings, an impairment category/score may be generated and assigned by the system to the subject. Based on the impairment category (e.g., not impaired, mildly impaired, severely impaired, etc.), the system may determine what action(s) to take. For example, based on the impairment level, the system may disable equipment, lock a barrier, generate an audible and/or visible alert, and/or transmit an electronic notification to one or more destinations.

Optionally, the sensors need not be installed on equipment or at a facility. Instead, optionally a user device of the subject (e.g., a smart phone, tablet, or other electronic device equipment with sensors) may be used in performing impairment detection. For example, a user device microphone, camera, tilt sensor, and/or accelerometer may be used in performing impairment detection. Optionally, dedicated sensors may be installed on equipment or at a facility and used to sense various characteristics of the subject. Optionally, both user device sensors and dedicated sensors installed on equipment or at a facility may be used in combination for detecting impairment.

Thus, the analysis described above may be used to detect impairment/medical states of subjects prior to or while operating dangerous machinery (e.g., cranes, lathes, drills, saws, power plants, mining equipment, etc.) or vehicles (e.g., planes, ships, trains, buses, automobiles, motorcycles, and/or the like), or performing certain other tasks (e.g., performing security duties, medical procedures, etc.), where certain impairment/medical states may indicate subject impairment with respect to operating such vehicles or other equipment or performing certain other tasks.

For example, a device may be used to capture subject speech, subject images, and/or other subject characteristics at a check-in terminal for pilots, train engineers, bus drivers, equipment operators, surgeons, crane operators, or the like, where the check-in terminal is equipped with a microphone and/or camera (e.g., as part of a mental status examination). By way of further example, equipment (machinery or vehicle to be operated by a subject) may be equipped with a device to capture subject speech and/or subject images prior to or while the subject is operating the equipment. The subject's speech and/or facial images may also be captured via a device of the subject (e.g., the subject' phone, laptop, wearable device, or other such device).

The speech and/or images may be analyzed to determine if the subject is under the influence of drugs or alcohol, or has a medical status that may impair the subject's ability to safely operate the machinery or vehicle. If a determination is made that the subject may be unable to safely operate the equipment, the equipment may be automatically disabled (e.g., so that the machine may not be operated or so the vehicle is not drivable or flyable) or switched to autopilot (where appropriate) via a command or other signal generated by the system. By way of further example, a barrier may be controlled (e.g., a door/gate may be closed, a door/gate lock may be locked, etc.) to prevent a person for accessing a certain location or equipment. In addition or instead, one or more impairment detection notifications may be generated, displayed, and/or transmitted to one or more destinations (e.g., an employer, a government regulatory agency, security personnel, etc.), and a notification may be transmitted to and/or presented to the subject regarding such determined impairment.

A subject's impairment may be scored based on detected speech, facial characteristics, eye tracking, and/or the like, such described herein. Optionally, certain characteristics, such as changes in formation of phonemes (e.g., that indicate slurring of speech) may be weighted more heavily than, other characteristics, such as changes in rapidity of speech. Different thresholds for detected or inferred subject impairment (e.g., caused by alcohol or drug use) may be set for different vehicle or other equipment types (of for certain tasks), wherein once a certain threshold is reached certain actions are performed (e.g., disabling of vehicle, transmission of notifications, etc.). For example, a lower threshold of detected impairment may be set for a pilot of a passenger jet than for an operator of a forklift.

For example, as discussed herein, an optional immobilizer/interlock system is provided for inhibiting equipment from being operated by impaired operators. The immobilizer/interlock mechanism may include an electronic and/or an electromechanical interlock mechanism. By way of illustration, the immobilizer/interlock mechanism may include a solid state relay which needs to be controlled to certain state to conduct a signal or power. By way of further example, the interlock mechanism may include a solenoid which may be controlled to inhibit the physical movement of a component, such as a lever, lock, key, or guarding device. By yet further example, an interlock mechanism may be used to isolate equipment from a power source (e.g., by opening an electromechanical or solid state relay) to prevent the equipment from being operated.

Thus, this document further describes systems, processes, and techniques that may be used to monitor the health and/or impairment of a subject based on audible expressions of the subject and/or images of the subject. For example, the recording of audible expressions from a subject (e.g., an equipment operator, a doctor, a teacher, a police officer, a fireman, etc.), the conversion of audible expressions into phonemes and text (word recognition), and/or the identification of audible expressions that indicate an adverse medical condition, the presence of impairing substances, and/or fatigue may be performed. This document also describes systems, processes and techniques that may be used to process the recording of images of a subject (e.g., a subject), extract features of the subject, and the identification of features that indicate an adverse medical condition, the presence of impairing substances, and/or fatigue. Aspects and non-limiting examples of health monitoring systems and processes are described in co-pending U.S. patent application Ser. No. 15/908,428, filed Feb. 20, 2018, "HEALTH MONITORING SYSTEM AND APPLIANCE," the content of which is incorporated by reference herein in its entirety.

The disclosed processes may be performed in whole or in part by a user device, a local system, and/or a cloud-based system. For example, some or all of a given disclosed process may be executed by a secure, cloud based system comprised of co-located and/or geographically distributed server systems. Information may be received by the cloud-based system from one or more terminals. A terminal may include or be connected (via a wireless or wired connection) to one or more sensors, such as one or more microphones, one or more cameras (e.g., front facing and/or rear facing cameras), one or more accelerometers, one or more pressure sensors, one or more tilt sensors, and/or the like. A terminal may include a display, a flash, a wired network interface, a wireless local network interface and/or wireless cellular interface. It is understood that a terminal may be distributed in the sense that not all terminal sensors need to be housed together. For example, a terminal camera may be housed separate from a terminal microphone.

For example, the terminals may include a device belonging to a subject who is being monitored for an impairment condition (e.g., a desktop computer, laptop computer, tablet, smart phone, networked television, network connected wearable device, etc.). The terminals may be affixed to equipment that the subject is to operate. The terminals may be placed at fixed locations, such as at the entrance to a facility or in an operating/surgical suite.

By way of illustration, optionally a given terminal may communicate information regarding an individual (e.g., audible and/or textual expressions, images, biometrics, pressure readings, accelerometer readings, etc.) from and/or to the local or cloud-based system via a web document using a browser and/or via a dedicated application (sometimes referred to herein as an "app") installed and hosted on a terminal.

Thus, optionally, some or all of the information processing described herein may be performed via a system remote from a sensor-equipped terminal (e.g., by the cloud system), or optionally some or all of the information processing described herein may be performed by the sensor-equipped terminal or local system.

As will be described in greater detail herein, a speech recognition engine that employs natural language processing (sometimes referred to as computational linguistics) may be utilized to analyze and/or understand audible speech of a subject. The speech recognition engine may be speaker independent.

Certain background information will now be provided related to speech. Words are expressed as combinations of basic speech sounds, sometimes referred to as phonemes. Phonemes may be classified into vowels and consonants. Such classification may be based on differences in phoneme waveforms and vocalization techniques. Vowels are articulated by arranging a speaker's vocal anatomy into relatively fixed configurations and blowing air across the speaker's vocal cords. As the cords vibrate, a train of air impulses is injected into the vocal tract, resonating at specific frequencies. The articulation of vowels does not result in significant obstruction of the airstream, and the sagittal midline of the vocal tract remains open. Because of cord vibration, the waveforms of vowels show periodic behavior, with a basic waveform repeating at a rate referred to as a pitch period.

Consonants, on the other hand, are formed by forming constrictions in the vocal tract using the tongue and other muscles, and obstructing the airflow using teeth, lips or tongue, causing momentary pauses in the speech signal, and then expelling air. Consonants may include a glottal stop, oral-nasal contrasts, affricates, fricatives, and constriction occurring along sagittal midline of the vocal tract. Thus, the waveforms of consonants include short pauses, reflected in dips in the amplitude of the speech signal. Speech that is unvoiced (such as a cough or a breath) does not exhibit periodicity, and this lack of periodicity may be used to distinguish such unvoiced sounds from phonemes.

FIG. 1 illustrates an example architecture. A system 106 (which may optionally be a cloud based system comprising one or more servers that are co-located and/or that are geographically dispersed) may host one or more applications that when executed cause a variety of the processes described herein to execute. For example, the system 106 may include a speech analysis engine, an image analysis engine, and/or an action determination module as described in greater detail herein.

Optionally, the cloud system 106 may include one or more Apache Hadoop clusters, optionally including a Hadoop distributed file system (HDFS) and a Hadoop MapReduce parallel processing framework. The system 106 may be configured to process and store large amounts of data that would not be effectively by conventional system. The system 106 may be configured to process and store large amounts of structured data, unstructured data, and/or semi-structured data. The data may relate to the subject-related data (including sound and/or image (e.g., still or video) recordings, scans, test results, contact information, calendaring information, biographical data, subject-related team data, etc.). The clusters may comprise master nodes (e.g., a name node, a job tracker, etc.), and slave nodes (e.g., data nodes, task trackers, etc.). A given data node serves data over a network using the distributed file system (e.g., HDFS) protocol. The file system may utilize a TCP/IP layer for communication. The distributed file system may store large files across multiple data node machines and may store copies of data on multiple hosts to enhance reliability and data availability.

With respect to the optional Hadoop implementation, other systems may submit tasks to the job tracker, which in turn, distributes the tasks to available task tracker nodes. Optionally, the job tracker may attempt to distribute a given task to a node in geographic proximity to the needed data. While the foregoing example refers to Hadoop clusters and related components, other distributed platforms may optionally be used in addition or instead to process and store data, such as large amounts of data including structured, unstructured, and/or semi-structured data, (e.g., distributed platforms utilizing Bashreduce, Qizmt, Spark, Disco Project, etc.).

The system 106 may communicate over one or more wired and/or wireless local and/or wide area networks (e.g., the Internet) 108 with one or more terminals, such as one or more user terminals 102 and one equipment mounted or location based terminals 104-1 . . . 104-N. For example, the terminal may be a standalone portable terminal 104-1, or part of an evaluation station 104-2 positioned at the entrance of or at an interior location of a building, or mounted within a vehicle 104-3, or to other requirement, such as a crane 104-4. As discussed above, a given terminal may optionally be a wireless mobile device (e.g., a smart phone, tablet, laptop, wearable, or the like) or a wired terminal (e.g., a desktop computer, a fixed or large networked television, a game console, or the like).

A given wireless terminal device may optionally be equipped with one or more wireless interfaces to communicate over WiFi, Bluetooth™, other local area wireless networks, other personal area networks, cellular networks, or the like. The terminals may optionally be equipped with one or more antennas connected to respective wireless interfaces. The antennas may be located within the housing of a terminal, and/or on the housing surface of the terminal.

The terminals may include a variety of sensors (e.g., sound, image, orientation, pressure, light, acceleration, and/or other sensors) configured to detect user input and interaction with the user terminals. The terminals may include touch screens configured to display user interfaces and data and receive user input via touch. The terminals may include physical keyboards. The terminals may include one or more microphones to receive voice data and/or commands, and one or more speakers to play audible content. The terminals may include a camera configured to capture, record, and/or stream video (and/or still image) data (which may be stored or streamed in association with captured audio data) to other systems, such as the system 106. For example, the camera may be a front facing camera of a phone, a PC/laptop webcam, or other image capture device. A given terminal may include or be configured with media players that enable the terminal to play video and/or audio content, and display still images.

The terminals may be associated with various user-types, such as a subject or monitoring personnel (that monitors equipment operators and the like for impairment).

Information between a given terminal and the system 106 may be synchronized continuously, periodically and/or in response to an event (e.g., a detection of a change of data or receipt new data). Optionally, some or all of the information communicated between a terminal app (e.g., an impairment detection app used in detecting whether a person is impaired) and the system 106 are transmitted securely (e.g., to comply with certain regulatory specifications). For example, in order to ensure confidentiality of medically related information, the medical information may be handled so as to comply with the Health Insurance Portability and Accountability Act (HIPPA). For example, as discussed below, some or all of the information may be encrypted using an encryption key.

The transmitted data may be secured by establishing a virtual private network (VPN) which establishes an encrypted transmission path between a terminal and system 106. Optionally, Secure Sockets Layer (SSL), a secure transfer tunnel, may be used to encrypt data in transit between the terminal (e.g., the impairment detection app and/or browser) and the system 106. Optionally, some or all of the information may be stored on the terminal and/or the system 106 using file encryption. Optionally, the encryption key may be stored physically separate from the data being encrypted (e.g., on different physical servers).

Optionally, access to medical and/or other subject information (e.g., records of subject speech, text, images, test results, diagnosis, impairment classification, etc.) is restricted through authentication. Authentication may be received in the form of a password and/or biometrics. For example, a terminal may be equipped with a fingerprint scanner which may be used to compare a fingerprint of someone attempting to access a terminal and/or the information regarding a subject who is being evaluated for impairment with that of an authorized user. If there is a match, access may be granted to the terminal and/or information regarding the subject. If the fingerprint fails to match a reference fingerprint of an authorized user, access to the user terminal and/or subject information may be denied.

Another technique of authentication biometrics may be in the form of facial recognition. For example, a terminal may be equipped with a camera which may be used to capture an image of someone attempting to access the terminal, impairment evaluation/classification, medical and/or other information regarding a subject (e.g., the dates and times for which a subject was evaluated to be too impaired to operate identified equipment or task). Features extracted from the image may be compared to stored features of an authorized user. If there is a match, access may be granted to the user terminal and/or user information. If the facial features fail to match, access to the terminal and/or user information may be denied. Other authentication techniques may be used, such as voice recognition, secure fobs, and the like.

An interface may include a record control, which when activated, enables video and/or audio to be recorded by the device hosting or accessing the application.

A given subject or other user (e.g., an evaluator) may establish an account on the cloud system. The user may be asked to provide various items of data during and/or after account setup, which may be stored in the cloud system and/or on the user's terminal in a user account record. For example, if the user is a subject, during account setup the user may be asked to provide subject history, subject demographics, medicine the subject is taking, health information (e.g., blood pressure, heart rate, medical condition, and/or the like), and/or other subject information discussed herein. The user may also be prompted to enable location based services for the application (e.g., the user may be navigated to a user interface via which the user may enable location based services for the application). This enables the application and/or cloud-based system to access location information (e.g., GPS information, WiFi information, etc.) provided by the terminal. The location information may be utilized as described elsewhere herein (e.g., to dispatch emergency medical services, transportation, security personnel, etc., to the current location of the terminal).

The subject may also be asked to make a video and/or audio recording of the subject speaking/vocalizing certain phonemes, vowels, consonants, phrases, sentences, paragraphs, and/or other units of speech. Text (e.g., a script) corresponding to the units of speech may be transmitted for presentation on the subject terminal while the subject is making the recording to enable the subject to read and repeat the presented units of speech text. For example, a user interface may present the recording in real time in a first area of the subject terminal display, and at the same time may present units of speech text (e.g., a script) in second area of the subject terminal display. The user may optionally be instructed to read certain items of text at a normal rate, certain items of text at a slow rate, and certain items of text at a rapid rate. The user may optionally be instructed to read certain items of text at a normal volume, certain items of text at a high volume, and certain items of text at a low volume.

The subject may also be prompted to provide free form speech, optionally regarding one or more specified topics and without a script. The free form speech may indicate the subject's current lexicon usage, syntax, semantics, and/or discourse patterns.

The subject may also be asked to eye track a moving image (e.g., a dot, a ball, a balloon, a person, etc.) displayed by the terminal. For example, the image may be moved from right to left, left to right, up to down, and down to up, or randomly bounce. The subject's eye and/or eyelid response (e.g., slow or drifting eye movements, lack of or deficits in saccadic movement, deficits in eye coordination, wavering eyelids, partial eye closures, drooping eyelids, etc.) may be monitored using a terminal camera and used in determining whether the subject is fatigued, under the influence of an impairing substance, or is undergoing or has undergone a medically related impairment episode. For example, the subject's blink frequency, blink duration, blink amplitude (e.g., in millimeters (mm) or degrees), blink amplitude to velocity (e.g., in mm or degrees/sec) ratio, saccade amplitude, and/or saccade amplitude to velocity ratio may be used in determining whether the subject is fatigued, under the influence of an impairing substance, or is undergoing or has undergone a medically related impairment episode. Optionally, the subject's eyes may be tracked using camera without asking the subject to perform eye tracking of a moving image.

By way of further example, a subject's eyes may be monitored to determine if they are bloodshot (which may indicate Cannabis use or fatigue) and/or for pupil dilation (which may indicate the use of LSD, cocaine, psilocybin mushroom, speed, other impairing substances, etc.).

The video and/or audio recording of the subject may optionally be used as a baseline for determining at a later time if the subject's impairment or health status has changed or is unchanged, as discussed elsewhere herein. Advantageously, the use of such a baseline in determining impairment may increase the ability to detect such impairment and may reduce the occurrence of false positives.

The application may periodically (e.g., once a day, twice a day, once a week, once a month, once every 4 weeks, once every six months, etc.) and/or in response to certain events (e.g., a change in job title, a change in medication, a change in medical status, a change in medical stability, a doctor's appointment, a medical test, and/or other events described herein), prompt the subject to record another baseline of the subject speaking certain units of speech and/or free form speech, optionally with accompanying images (e.g., video). The script presented to the subject for the recording may be configured to facilitate the later detection of changes formation of phonemes, pitch, volume, and/or rapidity of speech.

As similarly described elsewhere herein, if at a later time certain changes in the subject's vocalization and/or facial characteristics have been detected, an alert may be generated and transmitted to one or more destinations (e.g., to one or more designated members of the subject's support team, emergency transportation, emergency medical personnel, and/or the like).

Aspects and non-limiting examples of an electronic notebook that may optionally be used to collect, process, analyze and report user (e.g., subject) data are described in U.S. Pat. No. 9,899,038, issued Feb. 20, 2018, the content of which is incorporated by reference herein in its entirety. Such an electronic notebook may be used to collect, collect, process, analyze and report user data described herein.

Figure 2:
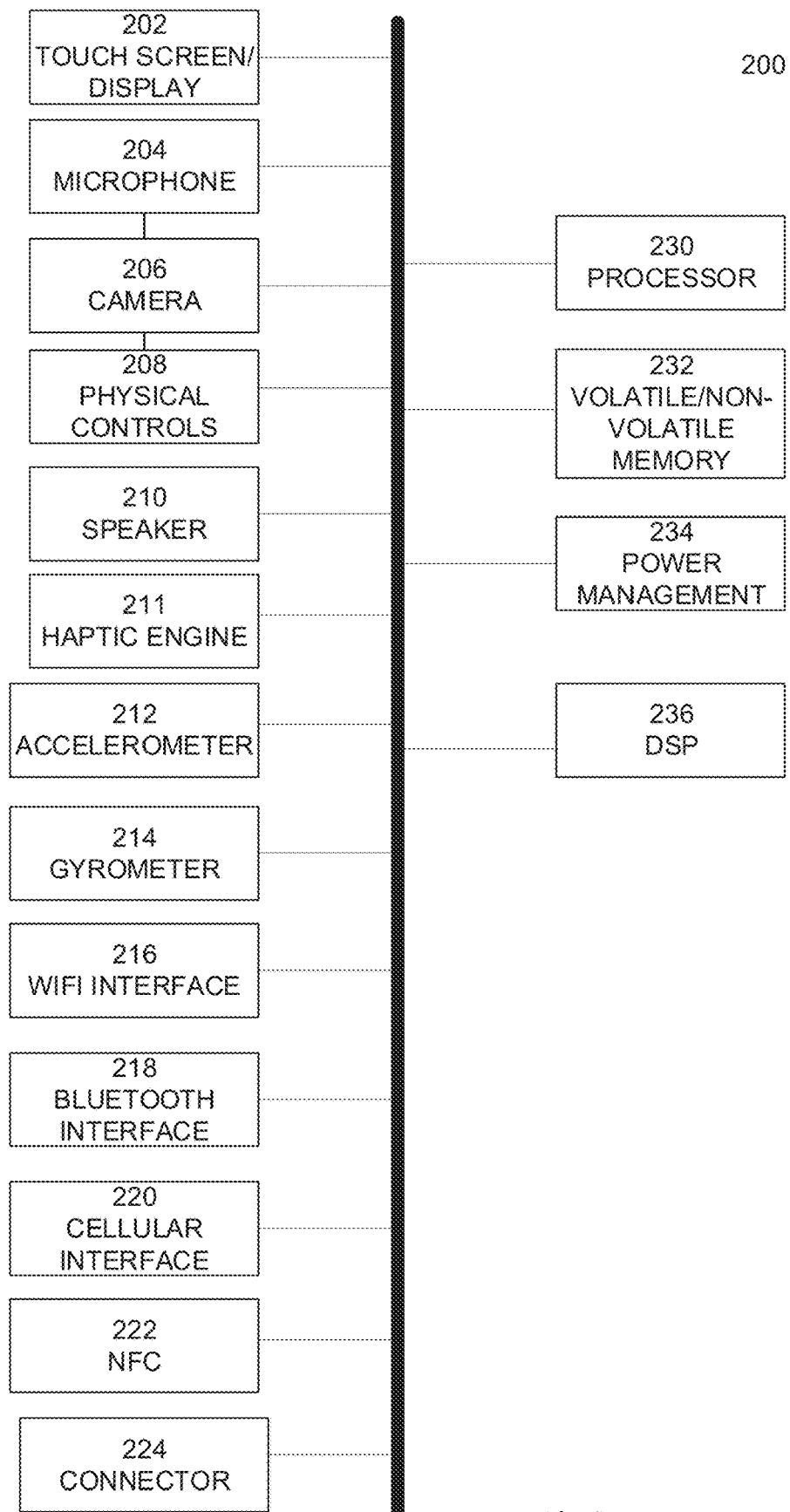
FIG. 2 illustrates an example user terminal architecture.

FIG. 2 illustrates an example terminal 200 in the form of a tablet, phone, laptop, evaluation station (e.g., including a camera at about eye level and a microphone positioned with or as part of the camera or at another location), or appliance. When the terminal 200 is in the form of an evaluation station (which may include a gate, a stand, and/or a table), the camera is optionally mounted on an adjustable height fixture (e.g., a mast) so that the camera may be manually or automatically be positioned (via motorized mast) at face level or at eye level. The microphone may include multiple condensers and may operate in one or more modes, such as stereo, cardioid (picking up sound only from the front of the microphone), omnidirectional, and/or bidirectional (picking up sound from both the front and the rear of the microphone). For example, using the microphone in cardioid mode, little background and ambient sound is picked up and recorded. The omnidirectional mode may be advantageously used where the position of the subject may not be predictable (e.g., the subject may be in front of, to the side of, or in back of the microphone).

In the example illustrated in FIG. 2, the terminal 200 includes various optional user input/output devices, such as an optional touchscreen/display 202, a microphone 204, a camera 206, physical controls 208 (e.g., a power on/off control, a volume control, a home control, etc.), a speaker 210, and/or other user input/output devices. The terminal 200 may optionally include a haptic engine 211 that provides kinesthetic communication to the user (e.g., via vibrations or taps, which may be used to confirm a user input via the touchscreen or otherwise, or to provide a notification), an accelerometer 212 that measures acceleration in 2-3 directions, and/or a gyrometer (e.g., a 3-axis gyroscope) 214 that measures orientation in three axis. The terminal 200 may be equipped with an external or integral physical keyboard, trackpad, joystick, electronic pen, and/or other input device.

The terminal 200 may include one or more wireless and/or wired interfaces. For example, the terminal 200 may include a WiFi interface 216, a Bluetooth interface 218, a cellular interface 220, an NFC (near field communication) interface 222, and/or one or more physical connectors 224 (e.g., a USB connector, a LIGHTING connector, and/or other connector). The terminal 200 further comprises a processor device (e.g., a microprocessor) 230, digital signal processor 236 (which may be module embedded in the processor device, 230), volatile memory (e.g., RAM solid state memory) and non-volatile memory (e.g., FLASH memory), and a power management device 234.

An application (e.g., an impairment detection electronic application) may be utilized to transmit audible input received from a user (e.g., a subject) via the microphone 204 and digitized using an analog-to-digital converter over a network to the system 106. Optionally, the audible input analysis may be performed using the voice-text application 306 discussed with reference to FIG. 3. The audible input may be initiated by the user or may be provided in response to a textual or audible prompt provided using the application. As described herein, the system 106 may optionally analyze the audible input (e.g., to determine a user's impairment or health status), and based on the audible input, take an appropriate action.

An application may (e.g., the impairment detection electronic application) also be utilized to transmit image data received by the camera 206 over a network to the system 106. The terminal 200 may transmit the image data over a network to the system 106 for processing and analysis (e.g., to determine a user's impairment or health status) as described elsewhere herein, and based on the image data, take an appropriate action. The action may be recorded in the impairment detection app diary and/or health timeline with a timestamp.

The electronic application may be provided or accessed in the form of any application obtained/downloaded by the terminal 200 via a third party application store and/or via the system 106.

The electronic application user interfaces may include a variety of data entry fields. The fields may be populated via a keyboard, a stylus, via voice entry (provided via the microphone 204) which may be converted to text via a voice-to-text module, or via facial, limb, or figure gestures captured by the camera 206. The keyboard and/or stylus may be included with the terminal 200. The stylus may optionally be configured with a sensor to determine stylus inclination and/or a sensor to measure the pressure being applied to the stylus by the user. The pressure and inclination information may be transmitted to the terminal 200 (e.g., via Bluetooth or other wireless or wired protocol) and such information may be used to identify user issues as described elsewhere herein.

Figure 3:
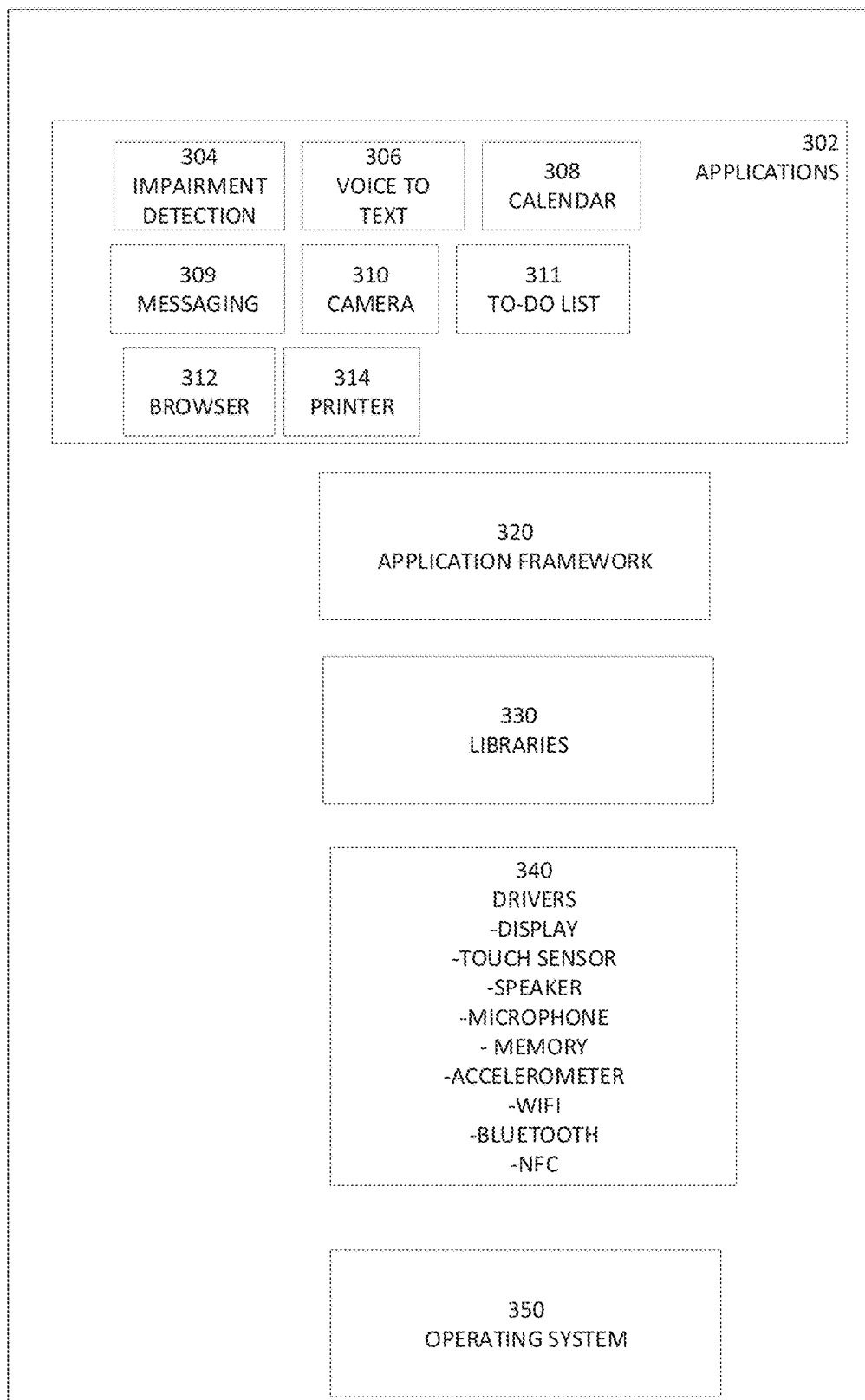
FIG. 3 illustrates an example software architecture for the example user terminal.

FIG. 3 illustrates an example, optional software architecture for a touch-enabled version of the example terminal 200 illustrated in FIG. 2. The software architecture may include an operating system 350 (e.g., GOOGLE ANDROID, APPLE iOS, MICROSOFT WINDOWS, APPLE OS, UNIX, LINUX, etc.), drivers 340 (e.g., display, touch sensor, speaker, microphone, memory, accelerometer, WiFi, Bluetooth, NFC, etc.), libraries 330 (e.g., SSL, Webkit, SQL, etc.), an application framework 320, and applications 302. For example, the applications 302 may include an impairment detection application 304, a voice-text application 306, a calendar application 308, a messaging application 309, a camera application 310, a to-do list application 311, a browser application 312, a printer application 314 and/or other applications. A given application may utilize another application as part of its operation. For example, the application 304 may call the voice-text application 306, the calendar application 308, the messaging application 309, the camera application 310, the to-do list application 311, the browser application 312, and/or the printer application 314. Two or more of the applications may be integrated into a single application. The application 304 may be configured to perform some or all of the functions and processes described herein.

Figure 4:
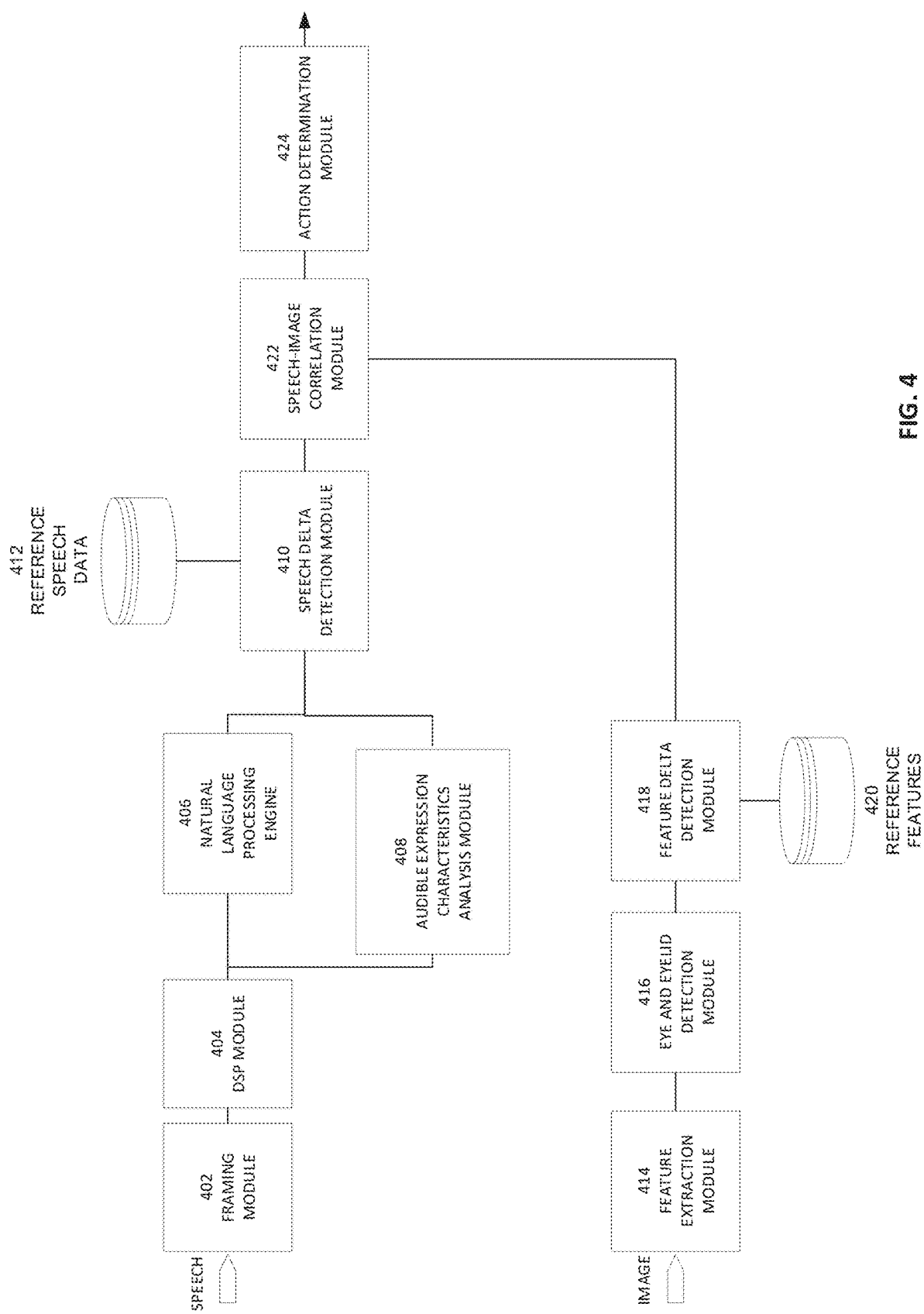
FIG. 4 illustrates an example speech processing system and image processing system.

FIG. 4 illustrates an example speech processing system and image processing system. All of portion of the speech processing system and image processing system may be hosted by the system 106 and/or by terminals (e.g., terminal 102 or terminal 104-1). Thus, the speech processing system and image processing system may comprise a distributed networked system.

By way of illustration, the example speech processing system may detect slurred or unintelligible speech, shaky speech, broken speech (where there is a pause within a word), disjointed speech, word interjections, repetitive speech, phrase interjections, sound interjections, word omissions, word revisions, broken suffixes, slower, lower in overall amplitude, errors (at the sentence, word, and/or phonological level), longer vocal tract closure durations than is typically obtained in the analyses of stop consonants, other speech and vocal tract characteristics described herein, and the like. The example speech processing system may optionally detect changes in some or all of the foregoing relative to a baseline or other historical recording. The baseline recording may optionally have been recorded immediately after the subject has been verified to be impairing substance-free (e.g., as verified using one or more techniques that may be more intrusive and/or time consuming, such as a drug test strip and/or urine analysis) to ensure that the baseline speech is unaffected by impairing substances. An indication may be stored with the baseline recording indicating that the baseline was recorded after the subject has been tested for impairing substances.

The comparison of current speech of a subject with baseline, historical speech of the same subject provides enhanced information as compared to a comparison of current speech of a subject with speech of a reference normal (e.g., healthy population that is not under the influence of an impairing substance) or typical population. For example, a comparison of current speech of a subject with that of a reference normal population will not indicate changes in a subject's medical state or impairment. Further, a given subject may not be "typical" and hence, a comparison with speech of a reference normal population may provide misleading and erroneous indications with respect to the user's current medical state or impairment. However, optionally, a comparison of current speech of a subject with that of a reference normal population may be performed and utilized.

A framing module 402 receives digitized audible expressions, in the time domain, from a speaker (e.g., a subject). For example, the audible expressions may have been received via a user terminal microphone (e.g., microphone 204) after having been digitized using an analog-to-digital converter. The digitized audible expressions may be associated with time stamps. A video recording may be made in conjunction with the audio recording, and as discussed below, may also be used to determine changes in the speaker's impairment or health status. Optionally, the speaker may be prompted, via a textual script, to speak certain phonemes, vowels, consonants, phrases, sentences, paragraphs, and/or other units of speech. The script may include some or all of the units of speech for which an earlier recording already exits, where the earlier recording may be used as a baseline for comparison. For example, as discussed above, the speaker may have been requested to make a baseline recording of the speaker reading certain units of speech, optionally at different rates and volume levels. The speaker may optionally be prompted to provide free form speech.

If the framing module 402 is hosted by the system 106, the digitized audible expressions may have been transmitted by the user terminal over a network to the system 106. The framing module 402 may apply frame blocking to the digitized audible expression. Frame blocking may be utilized to divide the received audible expression into segments, referred to as frames. For example, a frame may optionally be 5-250 ms in duration (although other durations may be used). A given frame may optionally overlap with a preceding frame (assuming there is a preceding frame) and/or a subsequent frame (assuming there is a subsequent frame). A given frame may be associated with a respective time stamp.

A digital signal processing (DSP) module 404 may optionally be utilized to convert the framed audible expressions from the time domain to the frequency domain. The DSP module 404 may optionally be in the form of circuitry specifically configured to perform signal processing. For example, the DSP module 404 may include a dual bus architecture, with separate memories for data and program instructions, with separate buses for each. Because the buses operate independently, program instructions and data can be fetched at the same time, improving the speed over a conventional single bus design. The DSP module 404 may optionally include a high speed instruction cache that stores a number of recently used instructions, thereby decreasing the access time of such instructions. The DSP 404 may be configured with instruction sets enhanced for DSP operations, such as multiply-accumulates (which may be used in quickly performing matrix operations (e.g., convolutions for filtering, calculating dot products, etc.), FIR filters, Fast Fourier Transforms, etc.)). The DSP module 404 may utilize a single instruction, multiple data (SIMD) instruction set architecture for parallel processing that exploits data level parallelism. The DSP module 404 may utilize a very long instruction word (VLIW) instruction set architecture to enable programs to explicitly specify instructions to execute in parallel (rather than requiring instructions to execute in sequence as is conventional), thereby enabling higher performance as compared to conventional instruction set architectures.

The DSP module 404 may optionally apply a Fast Fourier Transform (FFT) to covert the framed audible expressions from the time domain to the frequency domain and to obtain a magnitude spectrum of the audible expressions. The transformation of speech signals into a spectrum, such as a power and/or magnitude spectrum may make the identification the locations of vowels, consonants, noise, and the like more accurate and may require less processing power to perform such identification. Optionally, frequencies that are close to each other (e.g., within a threshold range) may be warped to a logarithmic scale to reduce the amount of frame data that needs to be processed. Dimensionality reduction can optionally be performed (e.g., using discrete cosine transforms) to further reduce the amount of frame data that needs to be processed. Optionally, a feature vector for a given frame is generated that represents that relative strength of certain frequencies relative to others in the frame (e.g., providing a compact representation of timbre).

A natural language processing engine 406 may be utilized to perform natural language processing on the audible expressions using the output of the DSP module 404. At a high level, the natural language processing engine 406 initially determines the general location of phonemes and their waveform characteristics (e.g., using feature extraction), uses pattern recognition to identify the phonemes, and maps the phonemes onto words. The natural language processing may optionally be speaker independent and/or text independent.

As will be described in greater detail elsewhere herein, the natural language processing engine 406 may be utilized to perform phoneme analysis, lexical analysis, semantic analysis, discourse analysis, and/or pragmatic analysis. The natural language processing engine 406 may optionally identify disjointed speech, repetitive speech, word interjections, phrase interjections, word omissions, word revisions, and/or broken suffixes. The natural language processing engine 406 may output text corresponding to audible expressions and/or generate indications of an estimated/inferred subject's impairment or health status. For example, changes in speech patterns over time (e.g., decreased use of polysyllabic words, decreased average number of words in sentences, increased rate of speech (e.g., hurried/pressured speech)), may indicate new or problematic impairment or health issues.

Natural language processing may comprise the utilization of machine learning that analyzes patterns in data to improve the natural language processing software's ability to understand the entry. Natural language processing may utilize sentence segmentation, part-of-speech tagging (e.g., subject, object, modification, noun, adjective, number, etc.), parsing, named entity extraction (e.g., locating and classifying elements in text into various categories such as the names of persons, organizations, locations, expressions of times, quantities, monetary values, percentages, etc.), paraphrase recognition (determining when different phrases or sentences have the same meaning), and/or co-reference resolution (finding all expressions that refer to the same entity in a text).

As will be described in greater detail elsewhere herein, an audible expression characteristics analysis module 408 may be utilized to analysis various audible expression properties, such as pitch, volume, rapidity, vocal tract formation, and non-speech. Detected changes over time (e.g., slurring, air "leaks" during speech, long gaps between words, gaps within words, increases in jitter and shimmer (the frequency and amplitude variation of the sound), etc.) may indicate impairment or health issues. For example, jitter corresponds to small fluctuations in glottal cycle lengths and provides an indicator of motor control abilities and the impairment or health status of the vocal system.

An optional speech delta detection module 412 accesses historical speech data samples of the subject from a reference speech database 412, and compares the historical speech data samples with the output of the natural language processing engine 406 and audible expression characteristics analysis module 408 to determine if there has been a material change (which may indicate a change in the subject's impairment or health status). The historical speech data samples may optionally have been recorded as a baseline by the subject when setting up an account and/or afterwards, as similarly discussed elsewhere herein. Optionally, the historical speech data samples may include samples of the subject reading a script configured to make it easier to detect changes in speech and vocalizations. Optionally, the historical speech data samples may include free form speech, indicating the subject's historical, natural lexicon usage, syntax, semantics, and/or discourse patterns.

For example, the speech delta detection module 412 may detect changes in the formation of phonemes, lexicon usage, syntax, semantics, discourse patterns, pitch, volume, rapidity of speech, in inferred vocal tract formation, and in non-speech (e.g., length of pauses between words or other units of speech, shimmer, jitter, coughs, random non-speech audible expressions, etc.). Certain changes may be weighted more heavily than other changes in inferring that there is a change in the subject's impairment or health status. For example, changes in the formation of phonemes (e.g., that indicate slurring of speech) may be weighted more heavily than changes in rapidity of speech.

Optionally, images of the subject may be analyzed to aid in detecting the subject's impairment or health status. An optional feature extraction module 414 receives digitized image data (e.g., still or video image data) of the subject (e.g., a subject). For example, the image data may have been received via the user terminal camera (e.g., after having been digitized using an analog-to-digital converter). A given image (e.g., a video frame or still image) may be associated with a time stamp. The image data may have been recorded at the same time as the audible data, as discussed above. If the feature extraction module 414 is hosted by the remote system 106, the digitized image data may have been transmitted by the sensor-equipped terminal over a network to the system 106.

The feature extraction module 414 may extract and analyze features, such as facial features, in the image to perform face and/or emotion classification. For example, the feature extraction module 414 may detect smiles, frowns, sagging lips, crooked smiles, uneven eyebrows, facial droop, haggard or emaciated face, and/or other indicators of an impairment or health status. By way of illustration, crooked smiles, uneven eyebrows, facial droop on one side of the face, and the like may be indicative of a stroke. An eye and eyelid detection module 416 may detect and identify bloodshot eyes, dilated pupils, slow or drifting eye movements, lack of or deficits in saccadic movement, deficits in eye coordination, wavering eyelids, partial eye closures, and/or drooping eyelids (which may be indicative of fatigue or the presence of in impairing substance).

An optional feature delta detection module 418 accesses historical feature data samples of the subject from a reference features database 420, and compares the historical feature data samples with the outputs of the feature extraction module 414 and the eye and eyelid detection module 416 to determine if there has been a change (which may indicate a change in the subject's impairment or health status). By way of illustration, changes in the subject's smile, frown, lips (where one side of the user's mouth now droops), eyebrow position, facial droop, eye movement, eyelid characteristics, weight (e.g., by determining if the subject's face and/or body is thinner or fatter) etc., may be detected. The historical feature data samples may optionally have been recorded as a baseline by the subject when setting up an account and/or afterwards, as similarly discussed elsewhere herein. Optionally, the historical feature data samples may include still and/or video images of the subject reading a script and/or engaging in free form speech.

For example, if the subject had suffered a stroke (which resulted in facial droop) several weeks ago, and corresponding features were stored in the reference features database 420, then if the current image of the subject indicates that the subject has approximately the same facial droop, the feature delta detection module 418 may indicate no change in the subject's impairment or health status. If, on the other hand, the subject had not previously suffered a stroke (and did not suffer from facial droop), and corresponding "pre-stroke" features were stored in the reference features database 420, then if the current image of the subject indicates that the subject now has facial droop, the feature delta detection module 418 may indicate a corresponding change in the subject's impairment or health status (e.g., a stroke).

By way of further example, if the subject's face or body indicates no weight loss or a weight loss less than a threshold amount or percentage as determined by comparing facial and/or body dimensions with those stored in the reference features database 420 (optionally with an indication that the stored features where recorded after the subject was verified to be impairing substance fee), the feature delta detection module 418 may indicate no change in the subject's impairment or health status. If, on the other hand, the subject's face or body indicates significant weight loss greater than a threshold amount or percentage as determined by comparing facial and/or body dimensions with those stored in the reference features database 420, the feature delta detection module 418 may indicate a corresponding change in the subject's impairment or health status (e.g., the presence of an impairing substance).

Certain feature changes may be weighted more heavily than other changes in inferring that there is a change in the subject's impairment or health status. For example, changes in facial droop may be weighted more heavily than changes in eyebrow position in inferring a change in impairment or health status. By way of further example, changes in pupil dilation may be weighted more heavily than change in blink frequency in inferring a change in impairment or health status.

Optionally, an adverse impairment or health status condition may be detected without comparison with historical data (e.g., where applicable speech or image/feature historical data is not available). For example, if slurred speech and facial droop is detected, the system may determine that the subject has possibly suffered a stroke (even though the stroke may have occurred months ago) or is under the influence of an impairment substance. By way of further example, if bloodshot eyes and dilated pupils are detected, the system may determine that the subject is under the influence of an impairing substance.

An optional speech-image correlation module 422 correlates speech data (e.g., the output of the natural language processing engine 406, the audible expression characteristics analysis module 406, and/or the output of the speech delta detection module 410) with image data (e.g., the output of the feature extraction module 414, the eye and eyelid detection module 416, and/or the feature delta detection module 418) using respective time stamps. Such correlations may provide further information on the user's impairment or health status. For example, slurring of speech occurring at the same time the subject's eyelids are occluding more than a certain percentage of the subject's eyes may indicate a more significant adverse impairment or health status than slurring of speech occurring at a different time than eye occlusion.

The action determination module 424 determines what action to take based on the outputs of the natural language processing engine 406, the audible expression characteristics analysis module 406, the output of the speech delta detection module 410, the feature extraction module 414, the eye and eyelid detection module 416, and/or the feature delta detection module 418. For example, the action determination module 424 may access rules from a rules data store that determines what action to take based on the outputs of the natural language processing engine 406, the audible expression characteristics analysis module 406, the output of the speech delta detection module 410, the feature extraction module 414, the eye and eyelid detection module 416, and/or the feature delta detection module 418.

Actions specified by the rules may include generating a control signal and transmitting the control signal (e.g., via a wired or wireless interface) to disable equipment, lock a barrier, generate an audible and/or visible alert, and/or transmit an electronic notification to one or more destinations (e.g., via email, text messages, dedicated applications, webpages, or the like). The notification may optionally include location information of the speaker received from the speaker's terminal (e.g., latitude, longitude, an address, etc.), which may be provided by a GPS radio, WiFi localization, or other location determination device or techniques.

A generated notification may include the speech and/or image data (and optionally related diagnosis) that triggered the notification. For example, if the system detects that a subject's eyes are not properly tracking in video images and that the subject is slurring words in audio data, the system may include corresponding video and audio data in the notification, which may be played back via the recipient's receiving terminal and media player. In addition, the notification may include a transcription of the audio data performed by the natural language engine 406, including at least the text (e.g., including keywords) that triggered the notification. The system may identify and highlight in the notification key terms or slurred words that may indicate an impairment or health issue.

By way of illustration, if the action determination module 424 detects an elevated or immediate need for attention, an alert may be generated and provided to security and/or medical personnel (e.g., via a pop-up alert, an SMS/MMS message, an email message, a vibration alert, etc.), where the alert may indicate that the information included in the notification needs to be urgently reviewed, and that the subject may need immediate attention (e.g., to stop the subject from operating equipment or performing a task, or to provide medical treatment). For example, words and phrases that indicate urgency (and which may be included and highlighted in the notification) may include some or all of the following terms and/or other terms: confused, going to fall, trouble thinking straight, numbness, agony, bleeding, broken bone, can't get up, blind, dizzy, hopeless, worthless, suicidal, anxious, depressed, afraid, helpless, afraid, out-of-control, gun, knife, rage, violent, etc. Such terms may be stored in a dictionary of urgency terms, and the action determination module 424 may compare the subject's words and phrases with those in the dictionary, and if a match is detected, take an appropriate action.

In addition, certain detected voice characteristics may indicate that the subject is suffering from depression or post-traumatic stress disorder (PTSD). For example, subjects suffering from depression or PTSD are likely to have relatively more tense voice features as compared to people who are not suffering from depression or PTSD. Certain voice features that may be indicative of stress may be determined from a glottal source signal (e.g., estimated by iterative adaptive inverse filtering). Thus, voice tenseness, as determined from the glottal source signal, may be used to determine if a subject is suffering from a PTSD episode or depression. In addition, the speech of subjects suffering from PTSD may have long pauses, may frequently interrupt the speech of others, may have difficulty maintaining a steady conversation flow, may exhibit vocal strain, or may exhibit fast-paced speech, which may be detected and used to determine whether the subject is likely to be suffering from PTSD.

By way of further example, depression may be determined with a significant degree of accuracy based on extracted glottal flow features, such as the minimal point in glottal derivative, the maximum glottal opening, the start point of glottal opening, the and start point of glottal closing. By way of illustration, discontinuities in the speech signal may be used to identify glottal events. By way of yet further example, depression may be determined using prosodic features determined from a subject's voice, such as fundamental frequency, energy, switching pauses (the pause duration between a question is posed to the subject and the subject's response), and/or speaking rate.

By way of further example, urgency may be indicated if the subject's audible expressions is unintelligible or the speech (e.g., slurred speech) or text patterns indicate that the subject is under the influence of impairing substances, suffering a post-traumatic stress disorder (PTSD) episode, or is suffering a stroke. The alert may be dynamically generated and composed to include the keywords/terms that triggered the alert, and/or may indicate that unintelligible/slurred speech was detected. The alert may include historical video and/or audio content for playback so that the recipient can view the change in impairment or health status.

Thus, the action determination module 424 may generate or select text, graphics, a score, speech, and/or the like that indicates a recommendation as to how the subject's detected or inferred impairment or health status should be responded to. For example, the recommendation may be one or more of the following:

Send armed personnel to ensure the safety of the subject, other people, or property;

Send unarmed personnel to further investigate the subject's condition;
Send medical personnel to examine and treat the subject;
Immediate deployment of an ambulance to bring the subject to a treatment facility.

The action determination module 424 may also generate and include in the notification a preliminary impairment diagnosis based on the output of the natural language processing engine 406, the audible expression characteristics analysis module 406, the output of the speech delta detection module 410, the feature extraction module 414, the eye and eyelid detection module 416, and/or the feature delta detection module 418. For example, if slurred speech and bloodshot eyes are detected, the rules accessed by the action determination module 424 may indicate that the subject has taken an impairing substance or is highly fatigued.

Figure 5:
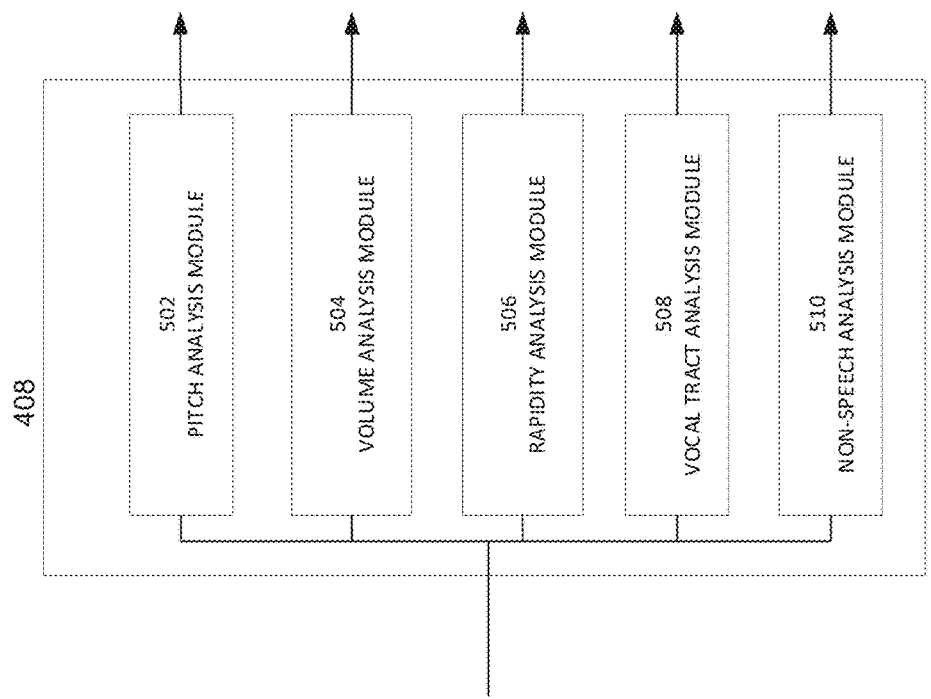
FIG. 5 illustrates an example architecture of an audible expression characteristics analysis module.

FIG. 5 illustrates an example architecture of the audible expression characteristics analysis module 408. A pitch analysis module 502 continuously determines the speaker's pitch. For example, the pitch analysis module 502 may estimate the period of a quasiperiodic signal in the speech, and then invert that value to give the pitch. Optionally, cepstrum pitch determination may be utilized by taking the inverse Fourier transform (IFT) of the logarithm of the estimated spectrum of a signal. A cepstrum indicates the rate of change in spectrum bands. A power cepstrum may be generated by taking the squared magnitude of the inverse Fourier transform of the logarithm of the squared magnitude of the Fourier transform of a signal.

A volume analysis module 502 continuously determines the speaker's speaking volume (e.g., by measuring the overall heights of the peaks in the power spectrum of the speech). A rapidity analysis module 506 may determine how quickly the speaker is speaking by measuring the "quiet time" between words and/or the number of words enunciated over a specified period of time (e.g., 5 seconds, 10 seconds, or other time period). The quiet time may be detected based on the power spectrum, where the overall heights of the peaks in the power spectrum of the speech are below a certain threshold.

A vocal tract analysis module 508 may analyze the magnitude spectrum of the speech to detect air "leaks" from the vocal track during speech (e.g., incomplete closure of the vocal tract which is marked by a "leak" of noise just prior to the fricative portion of a sound), improper onsets and offsets of stop and affricate closures, vocal tract constriction within a vowel segment, levels and increases in jitter (glottal cycle lengths) and shimmer, variations in pitch period when speaking vowels, pitch and variations in pitch, volume levels, intakes of air, and other indications of vocal tract formation and muscle control, which may indicate impairment or health issues.

A non-speech analysis module 510 may analyze the speaker's speech for pauses in speech (quiet periods) that are longer than a specified threshold.

Figure 6:
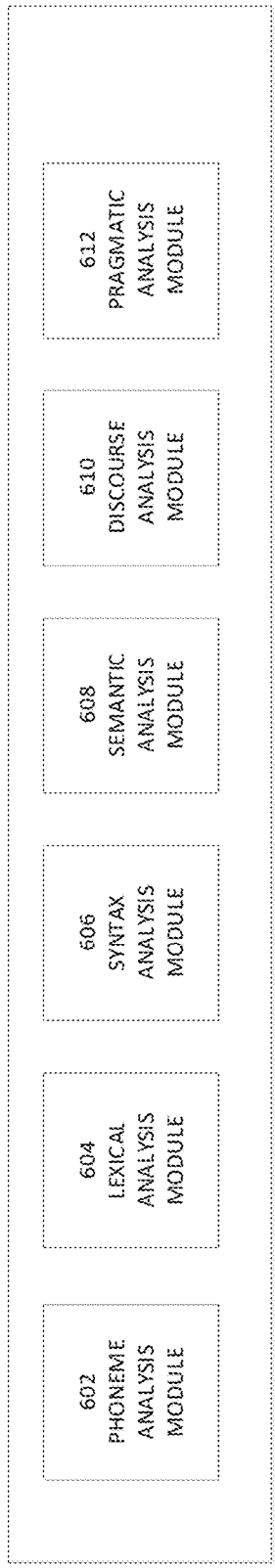
FIG. 6 illustrates an example natural language processing engine.

FIG. 6 illustrates an example implementation of the natural language processing engine 406. A phoneme analysis module 602 parses the incoming speech into phonemes. Optionally, a finite state transducer is used to perform such parsing. Optionally, the phoneme analysis module 602 may identify a phoneme boundary based, at least in part, on a detection of a rapid change in amplitude. Optionally, a statistical structure that encodes the probability of a sequence of events (e.g., one or more hidden Markov models) may be utilized to perform such parsing. For example, the hidden Markov model may be utilized to determine the probability of occurrence of different possible sequences of phonemes (e.g., using a triplet of phonemes). By way of illustration, optionally the phoneme analysis module 602 may analyze a speech segment, an immediately preceding speech segment, and an immediately following speech segment as a triplet. Triplets may be staggered. The phoneme analysis module 602 may compare a given triplet again stored reference phoneme data accessed from memory to identify potential matches. A match probability may be generated based on the comparison. The phoneme analysis module 602 may generate a temporal sequence of identified phonemes that correspond to the original speech signal. The phonemes may then be mapped to words (where a word may include one or more phonemes).

A lexical analysis module 604 divides the text into paragraphs, sentences, and words. A syntax analysis module 606 analyzes the validity of a sentence according to grammar rules. Optionally, context free grammar is used. By way of example, if a potential interpretation of an element of speech (e.g., a phrase or sentence) violates a grammar rule, the interpretation may be rejected and/or the interpretation may be marked as a potential impairment or health status indicator. By way of illustration, if a potential interpretation provides the following phrase "The door went out of I", because the interpretation violates grammatical rules, the interpretation may be rejected and/or the interpretation may be marked as a potential impairment or health status indicator (e.g., indicating that the speaker is under the influence of mind altering drug or is suffering from a stroke).

A semantic analysis module 608 analyzes the real meaning from the text. For example, the semantic analysis module 608 may assign text elements respective logical and grammatical roles. The semantic analysis module 608 may analyze context in the surrounding text and the text structure to disambiguate the proper meaning of words that have more than one definition. The semantic analysis module 608 may analyze the logical structure of a given phrase, clause, sentence, or paragraph to identify the most relevant elements in the text and identify the topic discussed. The semantic analysis module 608 may also understand the relationships between different concepts in the text and use such understanding to understand the subject of the text.

For example, the semantic analysis module 608 may determine that a unit of speech is about "technology" even if the unit of speech does not include the word "technology" but does include words or phrases that are related to the concept of "technology", such as "bandwidth", "streaming", "display resolution," etc. By way of further example, if a potential meaning of an element of speech (e.g., a phrase or sentence) does not make logical sense (e.g., "the giant tiny dog"), the potential meaning may be rejected and/or the potential meaning may be marked as a potential impairment or health status indicator (e.g., indicating that the speaker is under the influence of mind altering drug or is suffering from a stroke).

By way of yet further example, if the identified topic of sequential units of text (e.g., clauses within a sentence or from one sentence to another sentence) or nearby text (within a threshold number of sentences or clauses) indicate that the speaker is rapidly switching topics more than a threshold number of times, the potential meaning of a given unit of speech may be rejected and/or the rapid changes in subject may be marked as a potential impairment or health status indicator (e.g., indicating that the speaker is under the influence of mind altering drug or is suffering from a stroke). For example, if the identified topic of a first sentence is "cars" and the identified topic of a next sentence is "aliens", and the identified topic of a still next sentence is "headache", such rapid changes in subject may indicate that the speaker is having mental processing issues and may be under the influence of impairing substances.

A discourse analysis module 610 analyzes the text and may identify the discourse relationships between clauses, sentences, and/or paragraphs (e.g., where the meaning of a sentence may depend upon the meaning of the immediately preceding sentence). For example, a given sentence may provide elaboration or a contrast with a preceding sentience. The discourse analysis module 610 may also analyze text to identify a text act, such as a question, assertion, etc. The discourse analysis module 610 may identify discourse that indicates a possible impairment or health status of the speaker.

A pragmatic analysis module 612 analyzes the text and may reinterpret what was said to determine what was actually meant. For example, the pragmatic analysis module 610 may know how units of speech (e.g., sentences) are used in different situations and how use affects the interpretation of the sentence. Thus, the pragmatic analysis module 612 may determine the likely intention of the speaker and the conversation to aid in the interpretation of the unit of speech.

Figure 7:
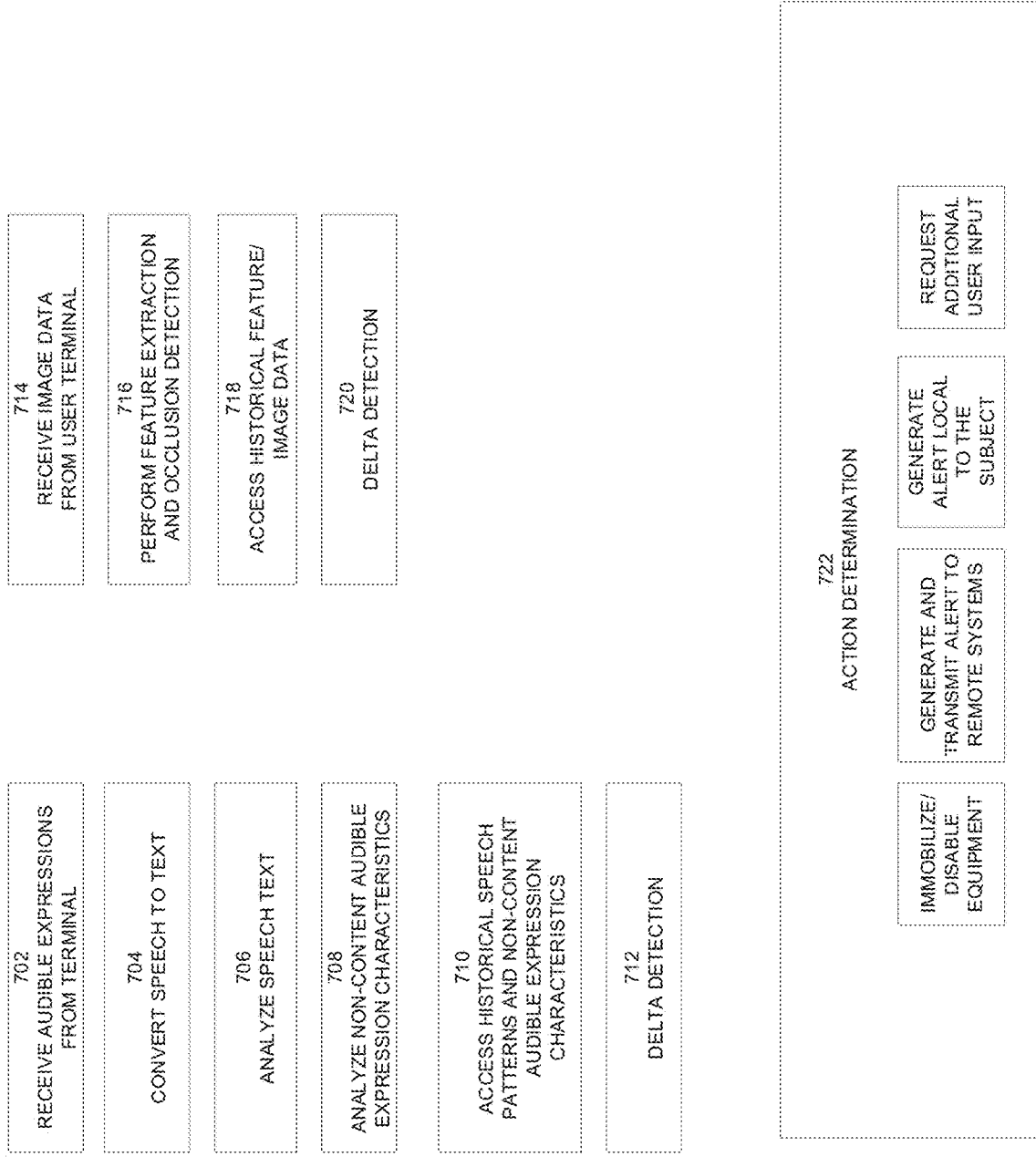
FIG. 7 illustrates an example process.

FIG. 7 illustrates a process for detecting subject impairment that may be implemented using the example speech processing system and image processing system described herein. As will be described, the process may perform an analysis of both speech content and acoustic-phonetic properties of a subject to determine if the subject is impaired. The process may also optionally analyze images of the subject to determine if the subject is impaired. The process may optionally be utilized in conjunction with an electronic application, described elsewhere herein.

At block 702, audible expressions from the subject are received (e.g., over a network) from a terminal microphone (e.g., where the microphone is part of the subject's phone or is part of a facility or other equipment the subject is to operate). At block 714, images (e.g., still and/or video images that are optionally streamed from the terminal) are received from a terminal camera. The audible expressions and images may be recorded at different times or at the same time (e.g., while the subject is recording a self-portrait ("selfie")) and included in the same video file. For example, the audible expressions and images may be received during an evaluation check-in process initiated by the application, where the application prompts the subject to provide certain information (e.g., how the subject is feeling, when did the subject last sleep and for how long, when did the subject last partake of an impairing substance, what type of impairing substance, the quantity of the impairing substance, is the subject taking prescribed medication, is the subject following a treatment plan, any new serious medical issues, etc.). Optionally, the subject may initiate the recording.

At block 704, the audible expressions are converted to speech using a natural language processing engine (e.g., natural language processing engine 406) in a speech-to-text operation. Optionally, non-decipherable speech is identified as such and a corresponding tag is assigned. Optionally, where a word is slurred or broken, the correct textual spelling of the word and the phonetic "as pronounced" spelling of the word is generated. For example, if the subject spoke the word "pleash", the natural language processing engine may convert the word to the text "please" and may also provide the text "pleash", with an indication as to which is the correct spelling and which is the spelling corresponding to how the word was actually pronounced.

At block 706, the content of the text is analyzed as similarly discussed elsewhere herein. For example, syntax, semantics, discourse, and/or pragmatic analysis may be applied to the text. Keywords may be identified that indicate the subject's impairment or health status (e.g., physical and/or mental impairment or health status). Disjointed speech, illogical speech, repetitive speech, rapid changes in subject, word interjections, phrase interjections, word omissions, word revisions, broken suffixes, and/or other potential impairment or health status indicators may be identified based on the text.

At block 708, audible characteristics of speech may be analyzed (e.g., that are content independent). For example, as similarly discuss elsewhere herein, some or all of the following may be monitored and identified: incomplete closure of the vocal tract, improper onsets and offsets of stop and affricate closures, vocal tract constriction within a vowel segment, levels and increases in jitter and/or shimmer, variations in pitch period when speaking vowels, pitch and variations in pitch, volume levels, intakes of air, and/or other indications of vocal tract formation and muscle control, which may indicate impairment or health issues.

At block 710, historical speech and non-content audible expression characteristics data for the subject is optionally accessed from a data store. Optionally, the request for historical speech and non-content audible expression characteristics data is filtered so that only historical data that is relevant to the current speech and content-independent audible expression characteristics is accessed, thereby reducing system processing load and enabling the system to identify changes in speech and non-content audible expression characteristics with greater speed.

At block 712, changes in speech and non-content audible expression characteristics are determined by comparing the current and historical speech and non-content audible expression characteristics data. A change may be identified based on thresholds. By way example, if a speech rapidity delta threshold is set to 20%, than if the rapidity of the current speech is within 20% of the historical speech, the change in speech rapidity may be characterized as within normal variations (effectively no change). If, on the other hand, the rapidity of the current speech is more than 20% faster than that of the historical speech, the change in speech rapidity may be characterized as indicating a potential change in impairment or health status. By way of further example, the current pitch period when speaking vowels is within 11% of the historical speech, the change in pitch period may be characterized as within normal variations (effectively no change). If, on the other hand, the pitch period is more than 11% slower than that of the historical speech, the change in speech pitch period may be characterized as indicating a potential change in impairment or health status.

At block 716, feature extraction and eye/eyelid detection may be performed. The process may detect and identify the subject's face in an image. For example, the process may generate a facial model based on the features and compare it with a library of facial models associated with subject identifiers, and determine if the facial model based on the image matches a historical facial model of the subject. The generated facial model may also be used to detect the subject's impairment or health status. For example, the facial model may be analyzed to detect if any part of the subject's face (e.g., cheek, lips, forehead, etc.) is drooping or twitching, or is very thin or haggard, which may indicate an adverse impairment or health status (e.g., stroke, seizure, impairing substance use, etc.). In addition, the facial model may be analyzed to determine various impairment indicators associated with eyes and eyelids. For example, process may optionally measure eye and/or eyelid movement to determine if the subject has slow or drifting eye movements, lack of saccadic movement (quick, simultaneous movement of both eyes between two phases of fixation in the same direction), loss of or deficits in eye coordination, wavering eyelids, partial eye closure, and drooping eyelids the degree to which subject's eyelids are covering the subject's eyes (e.g., and in particular, the pupils), which may indicate the subject's current impairment or health status. It is understood, that the functions performed at block 716 may optionally be in parallel with the speech/audible expression functions.

At block 716, historical image data (e.g., facial feature data, eye data, eyelid data, facial models, etc.) for the subject is optionally accessed from a data store.

At block 718, changes in features and eye/eyelid characteristics are optionally determined by comparing the current and historical features and eye occlusion data. A change may be identified based on thresholds. By way example, if the detected lip droop is within 5% of the historical lip droop, the change in lip droop period may be characterized as within normal variations (effectively no change). If, on the other hand, the current lip droop is more than 5% than that of the historical lip droop, the change in lip droop period may be characterized as indicating a potential change in impairment or health status. Similarly, if a subject's face indicates a weight loss of greater than 20%, then the weight loss may be characterized as indicating a potential change in impairment status (e.g., potential use of impairing substances) or health status.

At block 722, an action determination and initiation process may be performed based on the data identified or generated at other stages of the process (e.g., based on the outputs of block 704, 706, 708, 712, 716, and/or 720) and on one or more accessed rules. As part of the action determination process, one or more potential impairment diagnosis may be generated (e.g., based on the outputs of block 704, 706, 708, 712, 716, and/or 720) and/or previously generated impairment diagnosis may be utilized.

For example, as similarly discussed above, the actions may include immobilization of equipment (e.g., vehicles, construction equipment, warehouse equipment, medical equipment, manufacturing equipment, cooking equipment, safety barriers, firearms, etc.). By way of illustration, if a determination is made that a driver may be undergoing a hypoglycemia episode (based on a detection that the user has trouble speaking, appears confused, is undergoing a seizure, has poor motor control, etc.), the process may immobilize a vehicle (e.g., prevent the start button from starting the car, locking the transmission and/or brakes in a parked position, etc.) and generate an audible and/or visual alert to the drive and transmit an electronic alert message to one or more destinations (e.g., an employer, police, fire department, ambulance service, etc.). Optionally, an alert message may include the location (e.g., as an address, latitude/longitude, or otherwise) of the driver.

By way of further example, the subject may be asked to provide more input to the sensors so that further evaluations may be made. For example, the subject may be asked to repeat or read a phrase out loud or eye track a moving image displayed by the terminal. The process may repeat using the additional input.

Figure 8:
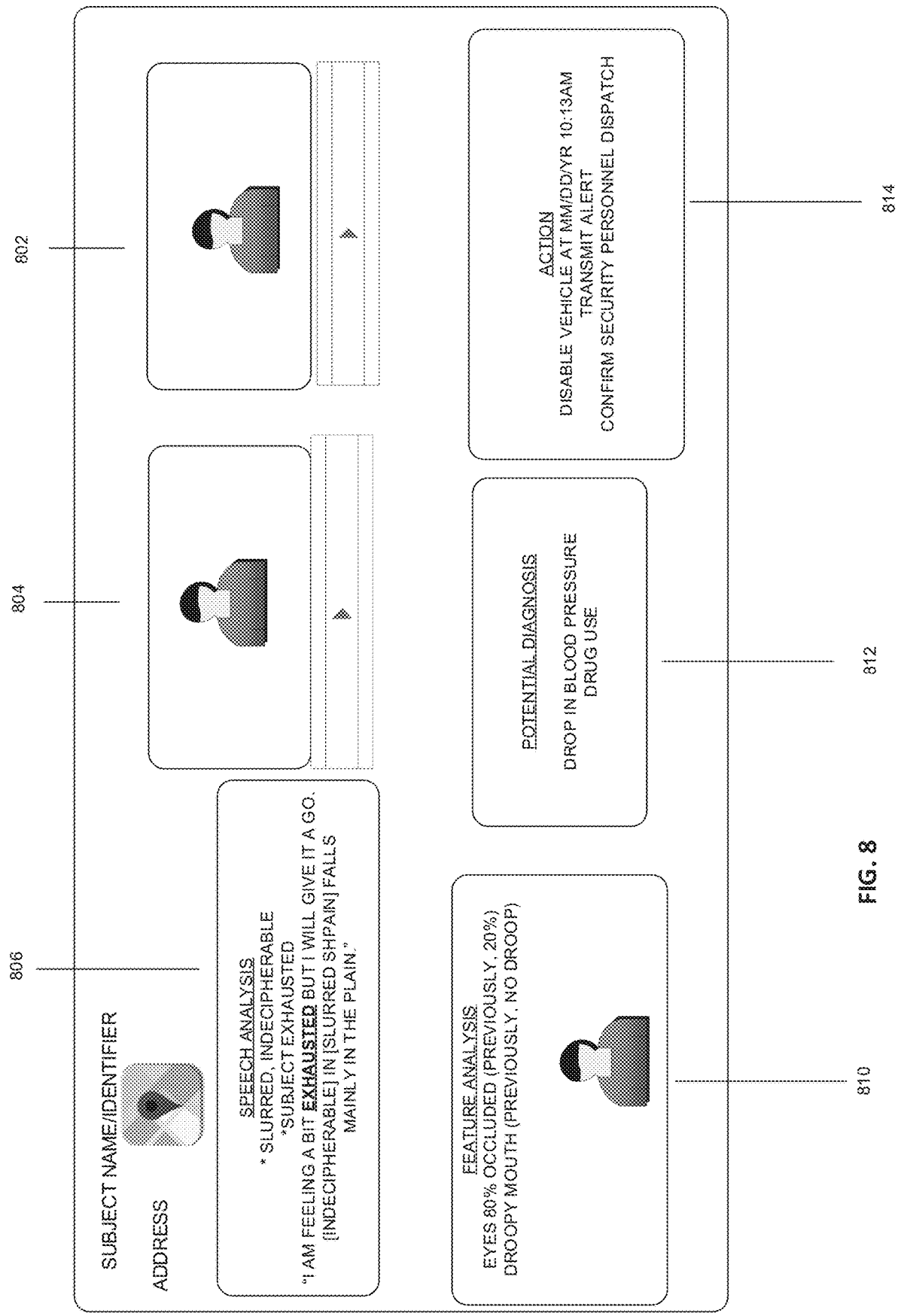
FIG. 8 illustrates an example user interface.

An example of an alert notification message is illustrated in FIG. 8. The alert message may include the name and/or other identifier (e.g., employee number) of the subject, the subject's job title, a map of the subject's current location, and/or the address of the subject's current location. Optionally, the alert message may include (e.g., via a file or a link to a file) a video 802 (including an audio tract) of the user that triggered the notification. The video 802 may be the complete video received from a terminal, or the video may be trimmed to only include the video/audio that caused the trigger (optionally include a set number of pre and/or post video/audio content). The video 802 may be displayed by a content player with associated controls (e.g., play, pause, rewind, fast forward, scrubber controls). Optionally, the notification may include (e.g., via a file or a link to a file) the historical video 804 (including an audio tract) used in the comparison with the current video. The video 804 may be displayed by a content player with associated controls (e.g., play, pause, rewind, fast forward, scrubber controls).

Optionally, the notification may include a text area 806 that provides some or all of the text obtained via the speech to text operation. Optionally, unintelligible speech is identified (e.g., with a text and/or graphic tag). Optionally, where a word is slurred or otherwise malformed, the correct spelling for the word and the phonetic spelling for the word corresponding to the user's actual pronunciation are provided.

Optionally, the results of the facial feature analysis 810 that indicate a potential impairment/health issue are provided. For example, the aspects of the facial features that indicate an impaired condition may be indicated (e.g., eyes 80% occluded, deficits in saccadic movement, drooping mouth, spasms, etc.). Optionally, a contemporaneous and/or historical still and/or video image of the subject may be displayed in conjunction with the feature analysis.

Optionally, a listing of potential impairment diagnosis 812 is provided (e.g., fatigue, stroke, high blood pressure, low blood pressure, drug use, alcohol use, seizure, etc.). Optionally, a listing of taken actions and/or recommended actions 814 is provided, optionally in association with a date/time log (e.g., equipment immobilized, door locked, security personnel dispatched to subject location, ambulance dispatched to subject location, notification of emergency room to expect subject, confirm that personnel have been dispatched (e.g., request that personnel send a confirmation response and determine if the confirmation response has been received), etc.)

Figure 9:
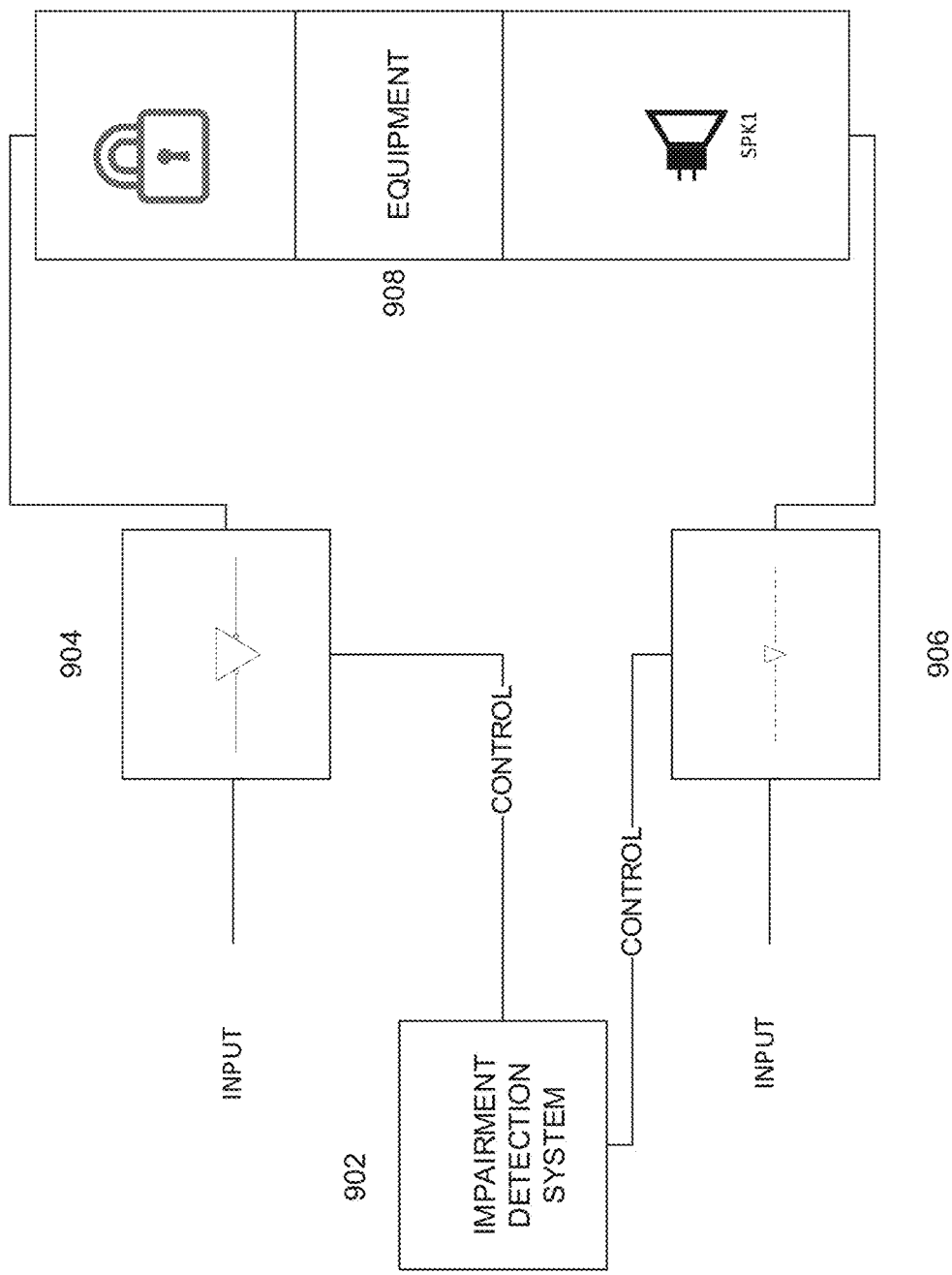
FIG. 9 illustrates an example circuit arrangement including electro-mechanical and electronic interlocks.

FIG. 9 illustrates an example circuit arrangement including electro-mechanical and electronic interlocks. An impairment detection system 902 is connected to a control input of a solid state relay 904 and/or a control input of an electro-mechanical relay 906 (e.g., comprising an electromagnetic relay consists of a coil of wire wrapped around a soft iron core to form a solenoid, a movable ferrous armature, and contacts). In response to determining that a subject is impaired past a certain threshold as similarly described elsewhere herein, the impairment detection system 902 may open one more of the relays 904, 906 to isolate target equipment from a power source (thereby preventing the target equipment from being utilized), and/or to isolate an activation control signal from activating the target equipment. Optionally, in addition or instead, activation of the relay(s) may cause a lock to be placed in a locked position and/or cause a visual and/or audible alert to be generated.

Figure 10:
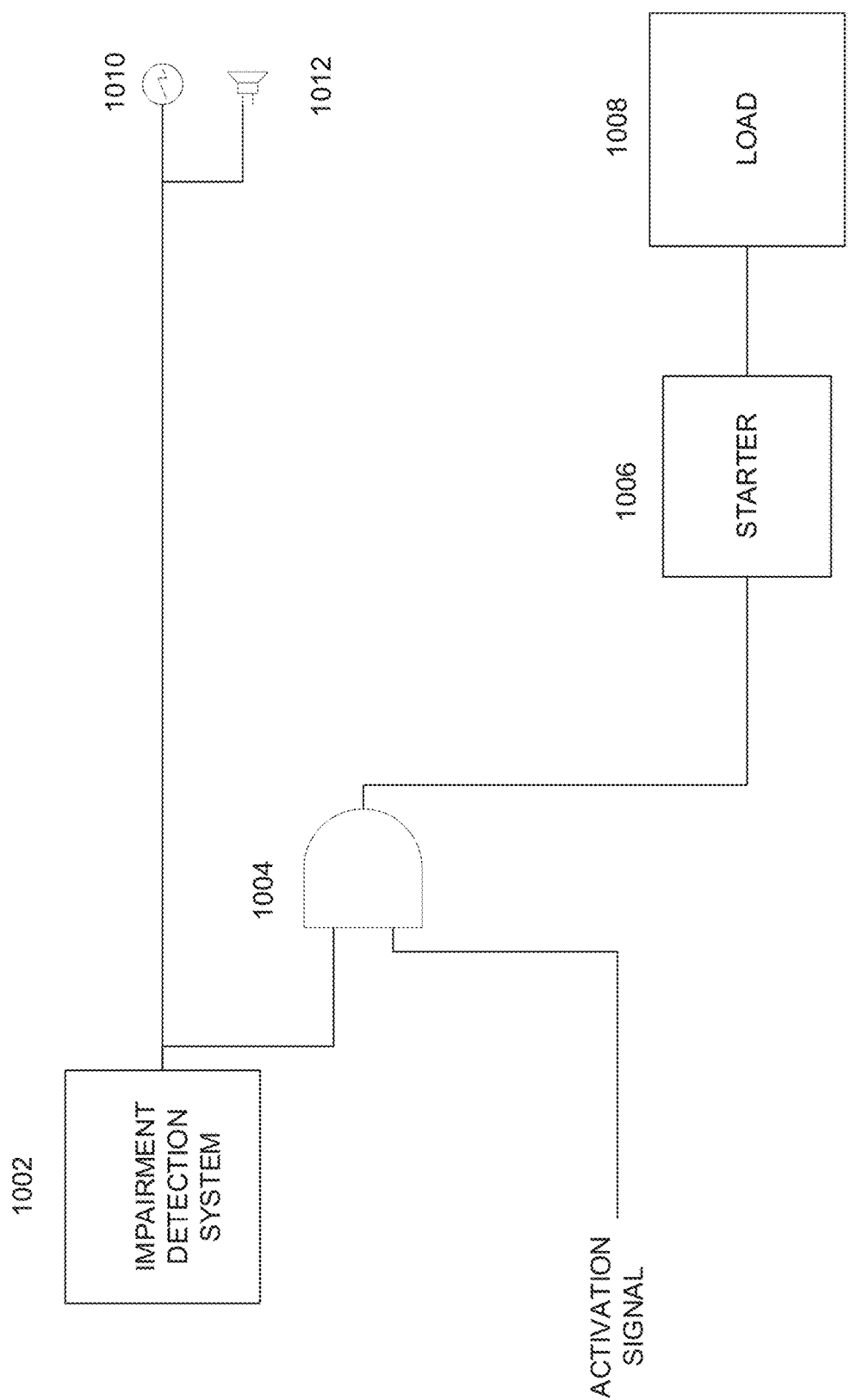
FIG. 10 illustrates an example vehicle disablement circuit.

FIG. 10 illustrates an example equipment (e.g., vehicle) disablement circuit. An impairment detection system 1002 is connected as an input to a logical circuit 1004. In this example, the logical circuit 1004 performs an AND function. A second input of the logical circuit 1004 is connected to a starter device 1006. The starter device 1006 in turn is connected to a load 1008 (e.g., an engine). In response to determining that a subject is impaired past a certain threshold, the impairment detection system 1002 may generate a logic '0' signals to the logical circuit 1004, which will in turn prevent an activation signal (e.g., generated by the subject activating a corresponding control) from activating the starter device 1006, which in turn prevent the starter device 1006 from starting the load 1008 (e.g., prevents the starter device 1006 from cranking an engine). In addition, a visual alert 1010 (e.g., a flashing light, a red light, etc.) and/or audible alert 1012 (via a speaker) may be generated.

Figure 11:
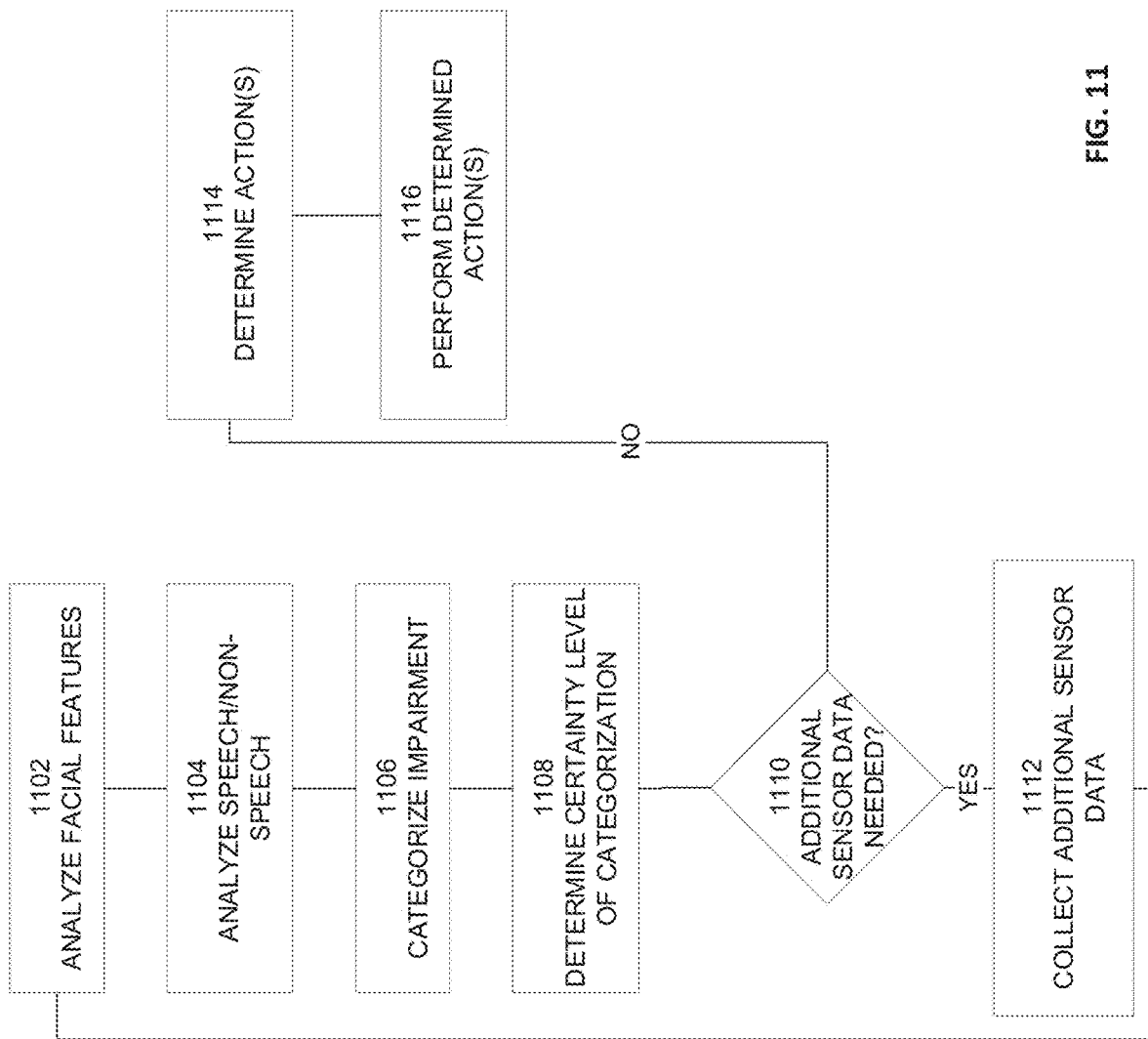
FIG. 11 illustrates an example process for detecting subject impairment and taking corresponding actions.

FIG. 11 illustrates an example process for detecting subject impairment and taking corresponding actions. At block 1102, a subject's features are analyzed from still and/or video images captured from a terminal camera as similarly discussed elsewhere herein. For example, a feature extraction process may analyze the images to detect smiles, frowns, sagging lips, crooked smiles, uneven eyebrows, facial droop, haggard or emaciated face, lost weight, bloodshot eyes, dilated pupils, slow or drifting eye movements, lack of or deficits in saccadic movement, deficits in eye coordination, wavering eyelids, partial eye closures, and/or drooping eyelids.

At block 1104, audible utterances (e.g., speech and/or non-speech utterances) from the subject are analyzed using a speech processing system, such as the example speech processing system described elsewhere here. The speech processing system may detect slurred or unintelligible speech, shaky speech, broken speech (where there is a pause within a word), disjointed speech, word interjections, repetitive speech, phrase interjections, sound interjections, word omissions, word revisions, broken suffixes, slower, lower in overall amplitude, errors (at the sentence, word, and/or phonological level), longer vocal tract closure durations than is typically obtained in the analyses of stop consonants, other speech and vocal tract characteristics described herein, and the like. Optionally, the speech processing system may detect changes in some or all of the foregoing relative to a baseline or other historical recording. Optionally, the baseline recording may have been recorded immediately after the subject has been verified to be impairing substance free with respect to one or more impairment substances.

An optional speech-image correlation module may be used to correlate speech data (e.g., the output of a natural language processing engine, an audible expression characteristics analysis module, and/or the output of a speech delta detection module) with image data (e.g., the output of a feature extraction module, an eye and eyelid detection module, and/or a feature delta detection module) using respective time stamps. Such correlations may provide further information on the user's impairment or health status. For example, slurring of speech occurring at the same time the subject's pupils are dilated may indicate a more significant adverse impairment or health status than slurring of speech occurring at a different time than pupil dilation.

At block 1106, the subject's impairment level is determined using the result of the facial features analysis and audible utterances analysis. Other factors may be taken into account, such as the subject's posture (as determined from the images of the subject), hair (e.g., has the subject recently gone bald), and/or the like. The impairment level may be assigned a score (e.g., on a scale of 0-10, where 10 corresponds to the most impaired and 0 corresponds to not impaired at all), grade (e.g., A-F where A corresponds to not impaired and F corresponds to most impaired), and/or description (e.g., not impaired, mildly impaired, significantly impaired, extremely impaired). The various impairment indicators may be differently weighted. Following is an example formula for calculating an impairment score, where the higher the score, the higher the impairment:

$$\text{Impairment Score} = w_1 n_1 \text{Factor}_1 + w_2 n \text{Factor}_2 + \ldots w_n n_n \text{Factor}_n$$

Where:
Factor=a value associated with a specific impairment factor, such as those discussed above (e.g., pupil dilation, percentage of visible eye sclera covered by swollen or dilated blood vessels, amount of eyelid droop, change in lip sag, number of pauses within word(s), number of slurred words, number of times unintelligible speech detected, number of word omissions, number of broken suffixes, vocal tract closure durations during constants, and/or other impairment factors discussed herein);
w=weight
n=normalization factor At block 1108, a certainty level of the impairment categorization/score may be determined. For example, the certainty level may be based on the number of samples were used in generating the categorization/score, where more samples may be needed for a given type of impairment indicator than another type of impairment indicator. By way of illustrative example, more images may be needed for a given level of certainty with respect to blink duration then for a determination as to whether the subject has bloodshot eyes.

A certainty score for a given impairment indicator may be:
Score of 1 if less than X number of samples
Score of 2 if between X and Y number of samples
Score of 3 if greater than Y number of samples
Where the values of X and Y may be different for different impairment indicators.

Following is an example formula for calculating impairment categorization certainty:

$$\text{Overall Certainty Score} = (cw_i \text{CertaintyScoreIndicator}_1 + cw_2 \text{CertaintyScoreIndicator}_2 + \ldots cw_n \text{CertaintyScoreIndicator}_n)/\#\text{of indicators}$$

Where:
CertaintyScoreIndicator=the certainty score for a given indicator;
cw=weight.

At block 1110, a determination is made using the overall certainty score as to whetehr additional samples are needed from the sensors (e.g., additional images of the subject's face, additional audible utterances, etc.). For example, if the overall certainty score is less than a pre-specified or dynamically determined overall certainty score, additional sensor readings may be needed. If additional sensor readings are needed, the process proceeds to block 1112, and additional sensor readings are collected (e.g., additional images of the subject's face, additional audible utterances, etc.), and the process may proceed to block 1102.

If, at block 1110, a determination is made that the overall certainty score is greater than a pre-specified or dynamically determined overall certainty score (indicating that the score is sufficiently certain), the process proceeds to block 1114, and actions corresponding to the impairment categorization/score are determined. For example, the process may determine that one or more of the following acts should be performed: disable equipment, enable equipment, lock a barrier, unlock a barrier, generate an audible and/or visible alert, and/or transmit an electronic notification to one or more destinations, as similarly discussed elsewhere herein. At block 1116, the determined actions may be performed.

Figure 12:
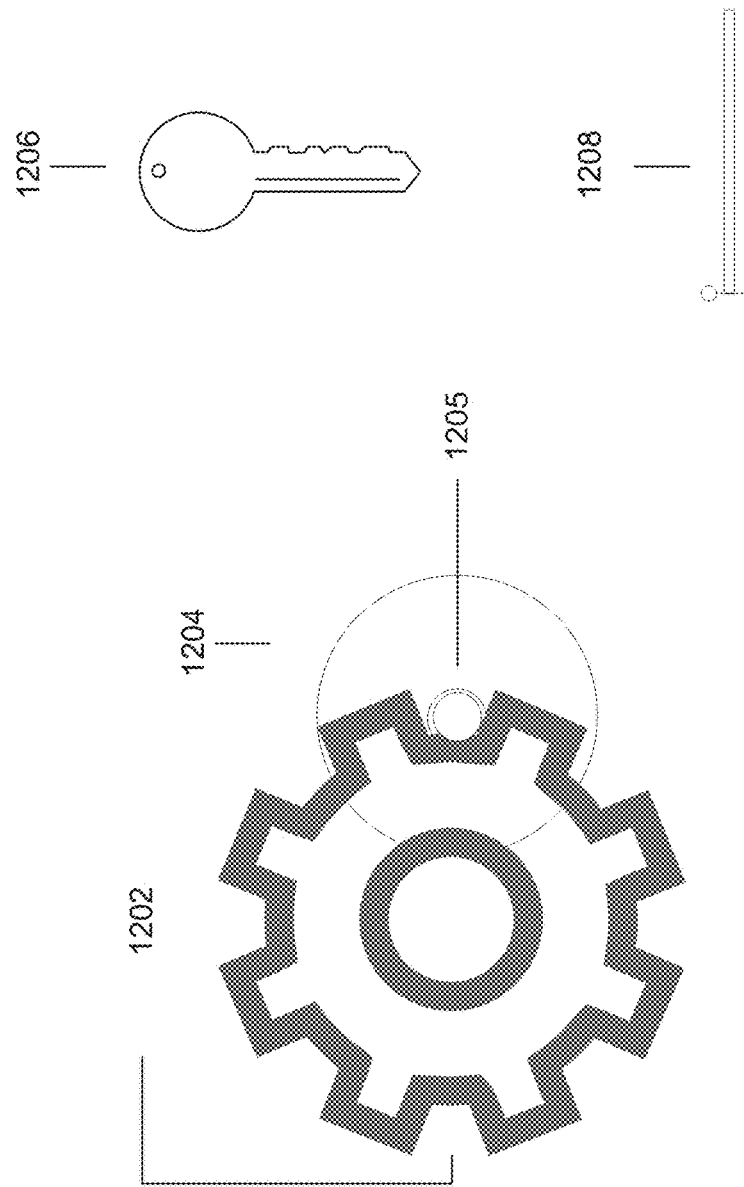
FIG. 12 illustrates an example mechanism that may be used to inhibit the operation of equipment.

FIG. 12 illustrates an example mechanism that may be used to inhibit the operation of equipment. The mechanism includes a gear 1202 (or cam or ratchet) and a solenoid 1204. The solenoid 1204 includes a rod 1205. The solenoid 1204 may be connected to and controlled by the impairment detection system, which may cause the rod 1205 to be positioned so at to enable or disable a corresponding item of equipment. In order to disable rotation of the gear 1202, the solenoid 1204 is activated/energized which causes the rod 1205 to extend through/between gear teeth to prevent rotation of the gear 1202. The gear 1202 may be coupled, by way of example, to a keyhole/key 1206 or a lever 1208 (or other control), to thereby prevent rotation of the keyhole/key 1206 or lever 1208 when the rod 1205 is raised. Similarly, if a cam is used, the raising of the rod 1205 may similarly block rotation of the cam. Thus, for example, if rotation of the keyhole 1206 or lever 1208 is prevented and rotation of the keyhole 1206 (by insertion and rotation of a key) or lever1208 are needed to utilize a corresponding item of equipment, the equipment is thereby effectively disabled.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An electronic interlock system configured to selectively immobilize equipment using an interlock device, comprising:
   a network interface;
   at least one computing device;
   computer readable memory including instructions operable to be executed by the at least one computing device to perform a set of actions, configuring the at least one computing device to:
   receive in real time, over a network via the network interface, a digitized human vocal expression of a first user;
   process the received digitized human vocal expression to:
      generate a power spectrum of the received digitized human vocal expression;
   use the generated power spectrum to identify quiet periods in the digitized human vocal expression;
   identify, using the identified quiet periods, length of pauses between words in the digitized human vocal expression;
   convert audible speech in the human vocal expression to text and characterize audible speech in the human vocal expression using the text;
   compare the characterized audible speech in the human vocal expression with baseline, historical characteristics of human vocal expressions associated with the first user to identify changes in human vocal expression characteristics of the first user;
   based at least on part on:

identified changes in human vocal expression characteristics of the first user, and the identified length of pauses between words in the digitized human vocal expression, determine an impairment categorization for the first user, wherein the determination of the impairment categorization for the first user is based in part on identified characteristics of the first user's face comprising slow eye movements, drifting eye movements, deficits in saccadic movement, partial eye closures, and/or drooping eyelids; and use the impairment categorization, determined based at least in part on the identified changes in human vocal expression characteristics of the first user and the identified length of pauses between words in the digitized human vocal expression for the first user, to determine whether the equipment is to be immobilized using the interlock device; and at least partly in response to a determination that the equipment is to be immobilized, controlling the interlock device so as to immobilize the equipment.

2. The electronic interlock system as defined in claim 1, wherein the impairment categorization is mildly impaired or severely impaired.

3. The electronic interlock system as defined in claim 1, wherein the interlock device comprises a solenoid that when activated, inhibits movement of a first component of the equipment.

4. The electronic interlock system as defined in claim 1, wherein the interlock device comprises a solenoid that when activated, inhibits rotation of a gear or cam.

5. The electronic interlock system as defined in claim 1, wherein the interlock device comprises a solenoid that when activated, isolates at least a portion of the equipment from a power source.

6. The electronic interlock system as defined in claim 1, wherein the equipment comprises a vehicle.

7. The electronic interlock system as defined in claim 1, wherein the interlock device is configured to selectively inhibit movement of a first control.

8. The electronic interlock system as defined in claim 1, the set of actions further comprising:

determine if there is sufficient sensor data to meet a first certainty threshold with respect to the impairment categorization; and acquiring additional sensor data as a response to a determination that there is insufficient sensor data to meet the first certainty threshold with respect to the impairment categorization.

9. The electronic interlock system as defined in claim 1, wherein the impairment categorization is determined using:

a determined pitch of the human vocal expression;

a determined volume of the human vocal expression;

a determination as to how rapidly the first user is speaking in the human vocal expression; and a determined magnitude and/or a power spectrum of the human vocal expression.

10. The electronic interlock system as defined in claim 1, the set of actions further comprising: use the impairment categorization for the first user to determine whether a notification is to be generated and transmitted to one or more destinations, the notification including the impairment categorization, at least a first image of the first user, and at least a portion of the text.

11. A computer-implemented method comprising:

under control of a hardware computing device configured with specific computer-executable instructions:

receiving, over a network via a network interface from a remote device, a digitized human vocal expression of a first user;

accessing a power spectrum of the received digitized human vocal expression;

using the power spectrum to identify quiet periods in the digitized human vocal expression;

detecting speech characteristics including length of pauses between words using the identified quiet periods in the digitized human vocal expression;

using the detected speech characteristics of the first user, including at least the detected length of pauses between words, to determine an impairment categorization for the first user, wherein the determination of the impairment categorization for the first user is based in part on identified characteristics of the first user's face comprising slow eye movements, drifting eye movements, deficits in saccadic movement, partial eye closures, and/or drooping eyelids;

using the impairment categorization for the first user to determine whether an item of equipment is to be inhibited from use by the first user; and at least partly in response to determining that the equipment is to be inhibited from use by the first user, controlling an interlock device so as to inhibit use of the equipment by the first user.

12. The method as defined in claim 11, wherein the interlock device comprises a solenoid that when activated, inhibits movement of a first component of the equipment.

13. The method as defined in claim 11, wherein the interlock device comprises a solenoid that when activated, isolates at least a portion of the equipment from a power source.

14. The method as defined in claim 11, wherein the interlock device is configured to selectively inhibit movement of a first control.

15. The method as defined in claim 11, the method further comprising:

determining if there is sufficient sensor data to meet a first certainty threshold with respect to the impairment categorization; and acquiring additional sensor data as a response to determining there is insufficient sensor data to meet the first certainty threshold with respect to the impairment categorization.

16. The method as defined in claim 11, wherein the impairment categorization is determined using:

a determined pitch of the human vocal expression;

a determined volume of the human vocal expression;

a determination as to how rapidly the first user is speaking in the human vocal expression;

a determined magnitude and/or power spectrum of the human vocal expression.

17. The method as defined in claim 11, the method further comprising:

converting audible speech in the human vocal expression to text; and using the impairment categorization for the first user to determine whether a notification is to be transmitted to one or more destinations, the notification including the impairment categorization, at least a first image of the first user, and at least a portion of the text.

18. A non-transitory computer-readable storage medium storing computer-executable instructions that when executed by a processor perform operations comprising:

access a digitized human vocal expression of a first user;

access a power spectrum of the accessed digitized human vocal expression;
use the power spectrum to identify quiet periods in the digitized human vocal expression;
detect speech characteristics of the digitized human vocal expression including:
length of pauses between words using the identified quiet periods in the digitized human vocal expression;
use the detected speech characteristics, including at least the detected length of pauses between words, to determine an impairment categorization for the first user, wherein the determination of the impairment categorization for the first user is based in part on identified characteristics of the first user's face comprising slow eye movements, drifting eye movements, deficits in saccadic movement, partial eye closures, and/or drooping eyelids; and
use the impairment categorization for the first user, to determine whether the first user is to be inhibited from performing a first action; and
at least partly in response to a determination that the first user is to be inhibited from performing a first action, generate a signal configured to cause the first user to be inhibited from performing the first action.

19. The non-transitory computer-readable storage medium of claim 18, wherein the signal configured to cause the first user to be inhibited from taking a first action controls a solenoid to inhibit movement of a first component.

20. The non-transitory computer-readable storage medium of claim 18, wherein the signal configured to cause the first user to be inhibited from taking a first action controls a solenoid to isolate at least a first item of equipment from a power source.

21. The non-transitory computer-readable storage medium of claim 18, wherein the signal configured to cause the first user to be inhibited from taking a first action controls an interlock device configured to selectively inhibit activation of a first control.

22. The non-transitory computer-readable storage medium of claim 18, the operations further comprising:
determining if there is sufficient sensor data to meet a first certainty threshold with respect to the impairment categorization; and
acquiring additional sensor data as a response to determining there is insufficient sensor data to meet the first certainty threshold with respect to the impairment categorization.

23. The non-transitory computer-readable storage medium of claim 18, wherein the impairment categorization is determined using:
a determined pitch of the human vocal expression;
a determined volume of the human vocal expression;
a determination as to how rapidly the first user is speaking in the human vocal expression; and
a determined magnitude and/or power spectrum of the human vocal expression.

24. The non-transitory computer-readable storage medium of claim 18, the operations further comprising using the impairment categorization for the first user to determine whether a notification is to be transmitted to one or more destinations, the notification including the impairment categorization and a video recording of the first user or a link thereto.

25. A computer-implemented method comprising:
under control of a hardware computing device configured with specific computer-executable instructions:
accessing a power spectrum of a digitized human vocal expression of a first user;
using the power spectrum to identify quiet periods in the digitized human vocal expression;
detecting speech characteristics of the digitized human vocal expression including:
length of pauses between words using the identified quiet periods in the digitized human vocal expression;
using the detected speech characteristics, including at least the detected length of pauses between words, to determine an impairment categorization for the first user wherein the determination of the impairment categorization for the first user is based in part on identified characteristics of the first user's face comprising slow eye movements, drifting eye movements, deficits in saccadic movement, partial eye closures, and/or drooping eyelids; and
using the impairment categorization for the first user, to determine whether the first user is to be inhibited from performing a first action; and
at least partly in response to a determination that the first user is to be inhibited from performing a first action, generating a signal configured to cause the first user to be inhibited from performing the first action.

26. The method as defined in claim 25, wherein the signal configured to cause the first user to be inhibited from taking a first action controls a solenoid to inhibit movement of a first component.

27. The method as defined in claim 25, wherein the signal configured to cause the first user to be inhibited from taking a first action controls a solenoid to isolate at least a first item of equipment from a power source.

28. The method as defined in claim 25, wherein the signal configured to cause the first user to be inhibited from taking a first action controls an interlock device configured to selectively inhibit activation of a first control.

* * * * *